United States Patent
Wang et al.

(10) Patent No.: US 11,968,569 B2
(45) Date of Patent: Apr. 23, 2024

(54) METHOD AND DEVICE FOR CONNECTION REESTABLISHMENT AND CONTEXT MANAGEMENT IN A WIRELESS COMMUNICATION SYSTEM

(71) Applicant: Samsung Electronics Co., Ltd., Suwon-si (KR)

(72) Inventors: Weiwei Wang, Beijing (CN); Hong Wang, Beijing (CN); Lixiang Xu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 220 days.

(21) Appl. No.: 17/298,826

(22) PCT Filed: Jan. 31, 2020

(86) PCT No.: PCT/KR2020/001501
§ 371 (c)(1),
(2) Date: Jun. 1, 2021

(87) PCT Pub. No.: WO2020/159291
PCT Pub. Date: Aug. 6, 2020

(65) Prior Publication Data
US 2022/0038965 A1 Feb. 3, 2022

(30) Foreign Application Priority Data
Feb. 1, 2019 (CN) .......................... 201910106385.2

(51) Int. Cl.
*H04W 36/00* (2009.01)
*H04W 36/30* (2009.01)

(52) U.S. Cl.
CPC ... *H04W 36/0061* (2013.01); *H04W 36/0033* (2013.01); *H04W 36/00837* (2018.08); *H04W 36/305* (2018.08)

(58) Field of Classification Search
CPC ......... H04W 36/0033; H04W 36/0061; H04W 36/00837; H04W 36/305; H04W 36/0055;
(Continued)

(56) References Cited

U.S. PATENT DOCUMENTS

2013/0259003 A1* 10/2013 Kwon .................. H04W 76/19
370/331
2013/0315075 A1* 11/2013 Tamura ................ H04W 24/10
370/242
(Continued)

FOREIGN PATENT DOCUMENTS

WO 2018/182286 A1 10/2018

OTHER PUBLICATIONS

3GPP; TSG RAN; NR; Study on Integrated Access and Backhaul (Release 16), 3GPP TR 38.874 V16.0.0, Jan. 10, 2019.
(Continued)

*Primary Examiner* — Kan Yuen
(74) *Attorney, Agent, or Firm* — Jefferson IP Law, LLP

(57) ABSTRACT

The present disclosure provides a connection reestablishment method, including: receiving a reestablishment message from a second node, the reestablishment message including information related to a configuration of the second node; performing a configuration based on the received reestablishment message; and transmitting a reestablishment complete message to the second node. The present disclosure also provides a context acquisition method, an interface management method, a UE context management method, a UE context acquisition method, a method for triggering UE to reestablish a connection, and various nodes and computer-readable medium that perform the above methods.

16 Claims, 16 Drawing Sheets

(58) Field of Classification Search
CPC ..... H04W 16/26; H04W 76/11; H04W 76/19; H04W 84/04; H04W 88/085
See application file for complete search history.

(56) References Cited

U.S. PATENT DOCUMENTS

| | | | | |
|---|---|---|---|---|
| 2014/0179325 | A1* | 6/2014 | Xu | H04W 36/08 |
| | | | | 455/437 |
| 2016/0066242 | A1* | 3/2016 | Su | H04W 36/0085 |
| | | | | 455/436 |
| 2017/0171784 | A1* | 6/2017 | Mitsui | H04W 76/20 |
| 2017/0265243 | A1* | 9/2017 | Hahn | H04W 76/38 |
| 2019/0166646 | A1* | 5/2019 | Shih | H04W 72/04 |
| 2019/0313244 | A1* | 10/2019 | Wang | H04W 8/24 |
| 2020/0029384 | A1 | 1/2020 | Hong et al. | |
| 2021/0315030 | A1* | 10/2021 | Teyeb | H04L 61/5076 |

OTHER PUBLICATIONS

Huawei et al., Discussion on security algorithm negotiation issue for Resume, RNAU and Reestablishment, R2-1817880, 3GPP TSG-RAN WG2 Meeting #104, Nov. 1, 2018, Spokane, USA.

Lenovo et al., RLF in backhaul link, R2-1817170, 3GPP TSG-RAN WG2 Meeting #104, Nov. 2, 2018, Spokane, USA.

Kyocera, Consideration of RLF recovery in IAB, R2-1817573, 3GPP TSG-RAN WG2 #104, Nov. 2, 2018, Spokane, USA.

Samsung, (TP for NR BL CR for TS38.473): Discussion on SCell RL failure, 3GPP TSG-RAN WG3 NR AdHoc 1807, R3-183871, Jul. 1, 2018, Montreal, Canada.

LG Electronics Inc., Handling of wireless backhaul link problem., 3GPP TSG-RAN WG2 AH Meeting, R2-1810662, Jul. 1, 2018, Montreal, Canada.

Vivo, IAB Topology and Routing Management, 3GPP TSG-RAN WG2 Meeting #103, R2-1811778, Aug. 10, 2018, Gothenburg, Sweden.

LG Electronics Inc., Consideration on cell reselection of IAB, 3GPP TSG-RAN WG2 Meeting #104, R2-1818292, Nov. 12, 2018, Spokane, USA.

European Search Report dated Nov. 24, 2021, issued in European Application No. 20748589.7.

ZTE et al.; Discussion on IAB RLF and IAB reestablishment; 3GPP TSG RAN WG3 Meeting #105bis; R3-195685; Chongqing, China; Oct. 14-18, 2019; Oct. 4, 2019.

European Search Report dated Nov. 15, 2023; European Appln. No. 20 748 589.7-1215.

* cited by examiner

METHOD AND DEVICE FOR CONNECTION REESTABLISHMENT AND CONTEXT MANAGEMENT IN A WIRELESS COMMUNICATION SYSTEM

TECHNICAL FIELD

The present disclosure relates to the field of wireless communication technology, and more particularly, to a connection reestablishment method, a context acquisition method, an interface management method, a user equipment (UE) context management method, a UE context acquisition method, and a method for triggering a UE to reestablish a connection in a wireless communication system, and various nodes and a computer-readable medium for performing the above methods.

BACKGROUND ART

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services can be provided according to the development of a wireless communication system, and thus a method for easily providing such services is required.

DISCLOSURE OF INVENTION

Brief Description of Drawings

The above and/or additional aspects and advantages of the present disclosure will become apparent and easily understood from the following description of embodiments in conjunction with the accompanying drawings, in which.

BEST MODE FOR CARRYING OUT THE INVENTION

Figure 1:
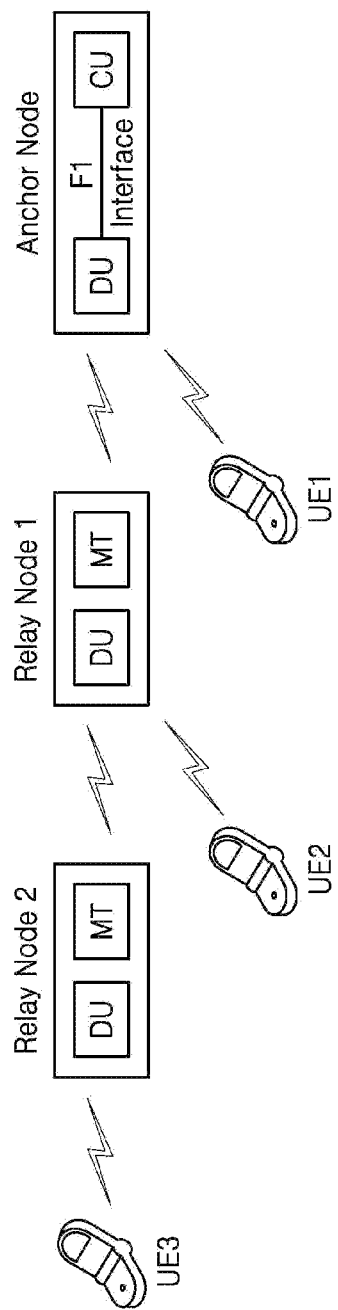
FIG. 1 schematically illustrates a multi-hop network architecture according to embodiments of the present disclosure.

In view of this, the present disclosure relates to the above three situations for the process of the relay node reestablishing the connection.

According to a first aspect of the present disclosure, a method performed at a first node for reestablishing a connection is provided. The method includes: receiving a reestablishment message from a second node, the reestablishment message including information related to a configuration of the second node; performing a configuration based on the received reestablishment message; and transmitting a reestablishment complete message to the second node.

According to a second aspect of the present disclosure, a method performed at a second node for reestablishing a connection is provided. The method includes: transmitting a reestablishment message to a first node, the reestablishment message including information related to a configuration of the second node; and receiving a reestablishment complete message from the first node.

In an exemplary embodiment of the first or second aspect of the present disclosure, the information related to the configuration of the second node includes at least one of: identification information of the second node, indication information for indicating whether the second node is a node to which the first node was connected before the first node reestablishes the connection or when a connection failure occurs, indication information for indicating whether an F1 interface needs to be established between the second node and the first node, indication information for indicating whether the second node has obtained a non-user-equipment (non-UE) related DU context and a UE related DU context of the first node, indication information for indicating whether the second node has obtained a non-UE related DU context of the first node, indication information for indicating whether the second node has obtained a DU context related to a UE accessing the first node, address related information of the second node side, address related information of the second node side for data transmission between the first node and the second node before the first node reestablishes the connection or when a connection failure occurs, address related information of the first node side, or address related information of the first node side for data transmission between the first node and the second node before the first node reestablishes the connection or when a connection failure occurs.

In an exemplary embodiment of the first or second aspect of the present disclosure, the first node is a relay node, and the second node is an anchor node.

According to a third aspect of the present disclosure, a method performed at a third node for acquiring a context is provided. The method includes: transmitting a context request message to a fourth node, the context request message including at least one of: information related to a mobile terminal (MT) part of a relay node, information related to a distributed unit (DU) part of a relay node, information related to a user equipment (UE) served by the DU part of the relay node, or type information of a requested context; and receiving a context response message from the fourth node, the context response message including at least one of: information of the relay node related to a backhaul link channel served by the MT part, or DU-related context of the relay node.

According to a fourth aspect of the present disclosure, a method performed at a fourth node for acquiring a context is provided. The method includes: receiving a context request message from a third node, the context request message including at least one of: information related to a mobile terminal (MT) part of a relay node, information related to a distributed unit (DU) part of a relay node, information related to a UE served by the DU part of the relay node, or the type information of the requested context; and transmitting a context response message to the third node, the context response message including at least one of: information of the relay node related to a backhaul link channel served by the MT part, or DU-related context of the relay node.

In an exemplary embodiment of the third or fourth aspect of the present disclosure, the information related to the DU part of the relay node includes at least one of: a non-UE related DU context of the relay node, or a UE related DU context of the relay node.

In an exemplary embodiment of the third or fourth aspect of the present disclosure, the information related to the MT part of the relay node includes at least one of: identification information used by the MT part of the relay node before the MT part initiates a connection reestablishment or when a connection failure occurs, identification information of a cell that was accessed by the MT part of the relay node before the MT part initiates a connection reestablishment or when a connection failure occurred, or shortMAC-I used by the MT part of the relay node before the MT part initiates a connection reestablishment or when a connection failure occurs.

In an exemplary embodiment of the third or fourth aspect of the present disclosure, the information related to the DU part of the relay node includes at least one of: identification information/name information used by the DU part of the relay node before the relay node reestablishes a connection or when a connection failure occurs, identification information used by the relay node before the relay node reestablishes the connection or when a connection failure occurs, identification information used by an anchor node or a central unit (CU) of the anchor node to which the relay node was connected before the relay node reestablishes a connection or when a connection failure occurs, address information of the anchor node side to which the DU part of the relay node was connected before the relay node reestablishes a connection or when a connection failure occurs, or address information of the DU side used by the DU part of the relay node for connecting the anchor node before the relay node reestablishes a connection or when a connection failure occurs.

In an exemplary embodiment of the third or fourth aspect of the present disclosure, the information related to a UE served by the DU part of the relay node includes at least one of: identification information of the UE served by the DU part of the relay node, identification information of a cell accessed by the UE served by the DU part of the relay node, shortMAC-I used by the UE served by the DU part of the relay node, identification information used by the UE served by the DU part of the relay node before the MT part of the relay node initiates a connection reestablishment or when a connection failure occurs, identification information of a cell accessed by the UE served by the DU part of the relay node before the MT part of the relay node initiates a connection reestablishment or when a connection failure occurs, or shortMAC-I used by the UE served by the DU part of the relay node before the MT part of the relay node initiates a connection reestablishment or when a connection failure occurs.

In an exemplary embodiment of the third or fourth aspect of the present disclosure, the third node is an anchor node or a CU of the anchor node connected to the relay node when reestablishing a connection, and the fourth node is an anchor node or a CU of the anchor node connected to the relay node before the connection is reestablished or when a connection failure occurs.

According to a fifth aspect of the present disclosure, a method performed at a first node for managing an interface is provided. The method includes: transmitting an interface management request message to a second node, the interface management request message including at least one of: information of a non-UE related DU context which is stored by the first node and used before the first node reestablishes a connection or when a connection failure occurs, information of a non-UE related DU context used by the first node when the first node transmits the interface management request message, information related to a mobile terminal (MT) part of the first node, or information related to a UE served by the first node, receiving an interface management response message from the second node, the interface management response message including at least one of: identification information/name information of the second node, radio resources control (RRC) version information of the second node, information related to a UE served by the first node, information related to a cell that needs to be activated or deactivated, address related information, or indication information for indicating reuse of the non-UE related context which is stored at the first node side and used before a connection is reestablished or when a connection failure occurs.

According to a sixth aspect of the present disclosure, a method performed at a second node for managing an interface is provided. The method includes: receiving an interface management request message from a first node, the interface management request message including at least one of: information of non-UE related DU context which is stored by the first node and used before the first node reestablishes a connection or when a connection failure occurs, information of a non-UE related DU context used by the first node when the first node transmits the interface management request message, information related to a mobile terminal (MT) part of the first node, or information related to a UE served by the first node, transmitting an interface management response message to the first node, the interface management response message including at least one of: identification information/name information of the second node, radio resources control (RRC) version information of the second node, information related to a UE served by the first node, information related to a cell that needs to be activated or deactivated, address related information, or indication information for indicating the reuse of the non-UE related context which is stored at the first node side and used before a connection is reestablished or when a connection failure occurs.

In an exemplary embodiment of the fifth or sixth aspect of the present disclosure, the information of the non-UE related DU context which is stored by the first node and used before the connection is reestablished or when the connection failure occurs includes at least one of: information related to a cell served by the DU part of the first node before the first node reestablishes the connection or when a connection failure occurs, or information related to activated or deactivated cells before the first node reestablishes the connection or when a connection failure occurs.

In an exemplary embodiment of the fifth or sixth aspect of the present disclosure, the information of the non-UE related DU context which is used by the first node when the first node transmits the interface management request message includes at least one of: information related to a cell served by the DU part of the first node when the first node transmits the interface management request message, or information related to a cell suggested to be activated or deactivated when the first node transmits the interface management request message.

In an exemplary embodiment of the fifth or sixth aspect of the present disclosure, the information related to the MT part of the first node includes at least one of: identification information of the MT part of the relay node, identification information of a cell accessed by the MT part of the relay node, or shortMAC-I used by the MT part of the relay node, In an exemplary embodiment of the fifth or sixth aspect of the present disclosure, the information related to the cell to be activated or deactivated includes at least one of: identification information of the cell, or system information of the second node side.

In an exemplary embodiment of the fifth or sixth aspect of the present disclosure, the address related information includes at least one of: Transmission Network Layer Association (TNLA) related information of the second node side, or TNLA related information of the first node side.

In an exemplary embodiment of the first or second aspect of the present disclosure, the first node is a relay node or a DU of the relay node, and the second node is an anchor node or a central unit (CU) of the anchor node.

According to a seventh aspect of the present disclosure, a method performed at a first node for updating an interface configuration is provided. The method includes:

receiving an interface configuration update request message from a second node for updating an interface configuration between the first node and the second node, the interface configuration update request message including at least one of: identification information/name information of the second node, radio resources control (RRC) version information of the second node, information related to a user equipment (UE) served by the first node, information related to a cell that needs to be activated or deactivated, or address related information; and transmitting an interface configuration update response message to the second node to acknowledge receipt of the interface configuration update request message.

According to an eighth aspect of the present disclosure, a method performed at a second node for updating an interface configuration is provided. The method includes: transmitting an interface configuration update request message to a first node for updating an interface configuration between the first node and the second node, the interface configuration update request message including at least one of: identification information/name information of the second node, radio resources control (RRC) version information of the second node, information related to a user equipment (UE) served by the first node, information related to a cell that needs to be activated or deactivated, or address related information; and receiving an interface configuration update response message from the first node to acknowledge receipt of the interface configuration update request message by the first node.

In an exemplary embodiment of the seventh or eighth aspect of the present disclosure, the first node is a relay node or a DU of the relay node, and the second node is an anchor node or a central unit (CU) of the anchor node.

According to a ninth aspect of the present disclosure, a method performed at a first node for managing a user equipment (UE) context is provided. The method includes: receiving a UE context management request message from a second node, the UE context management request message including at least one of: identification information of a UE accessing the first node, identification information of the first node, or information of a serving cell of the UE accessing the first node, configuring the UE accessing the first node according to the UE context management request message; and transmitting a UE context management response message to the second node, wherein the UE context management response message includes configuration information for configuring the UE.

According to a tenth aspect of the present disclosure, a method performed at a second node for managing a user equipment (UE) context is provided. The method includes: transmitting a UE context management request message to a first node, the UE context management request message including at least one of: identification information of a UE accessing the first node, identification information of the first node, or information of a serving cell of the UE accessing the first node, and receiving a UE context management response message from the first node, wherein the UE context management response message includes configuration information instructing the first node to configure the UE accessing the first node according to the UE context management request message.

In an exemplary embodiment of the ninth or tenth aspect of the present disclosure, the identification information of the UE accessing the first node includes at least one of: identification information of the UE after the first node reestablishes a connection, or identification information of the UE before the first node reestablishes a connection or when a connection failure occurs.

In an exemplary embodiment of the ninth or tenth aspect of the present disclosure, the identification information of the first node includes at least one of: identification information/name information of a distributed unit (DU) of the first node before the first node reestablishes a connection or when a connection failure occurs, identification information/name information of the first node before the first node reestablishes a connection or when a connection failure occurs, or identification information/name information of the second node to which the first node was connected before the first node reestablishes a connection or when a connection failure occurs.

In an exemplary embodiment of the ninth or tenth aspect of the present disclosure, the information of the serving cell of the UE accessing the first node includes at least one of: identification information of one or more cells serving the UE before the first node reestablishes a connection or when a connection failure occurs, identification information of one or more cells serving the UE after the first node reestablishes a connection, indication information for indicating releasing a cell serving the UE before the first node reestablishes a connection or when a connection failure occurs, or indication information for indicating the reconfiguring a serving cell of the UE.

In an exemplary embodiment of the ninth or tenth aspect of the present disclosure, the first node is a relay node or a DU of the relay node, and the second node is an anchor node or a central unit (CU) of the anchor node.

According to an eleventh aspect of the present disclosure, a method performed at a first node for acquiring a user equipment (UE) context is provided. The method includes: receiving a UE context acquisition request message from a second node, the UE context acquisition request message including at least one of: identification information of a UE accessing the first node, information of a serving cell of a UE accessing the first node, or shortMAC-I used by a UE accessing the first node before the first node reestablishes a connection or when a connection failure occurs, transmitting a UE context acquisition response message to the second node, the UE context acquisition response message including at least one of: a context of a UE for which the first node successfully obtained a context, or identification information of a UE for which the first node did not obtain a context successfully.

According to a twelfth aspect of the present disclosure, a method performed at a first node for acquiring a user equipment (UE) context is provided. The method includes: transmitting a UE context management request message to a first node, the UE context management request message including at least one of: identification information of a UE accessing the first node, information of a serving cell of a UE accessing the first node, or shortMAC-I used by a UE accessing the first node before the first node reestablishes a connection or when a connection failure occurs, and receiving a UE context acquisition response message from the first node, the UE context acquisition response message including at least one of: a context of a UE for which the first node successfully obtained a context, or identification information of a UE for which the first node did not obtain a context successfully.

In an exemplary embodiment of the eleventh or twelfth aspect of the present disclosure, the identification information of the UE accessing the first node includes at least one of: identification information of the UE after the first node reestablishes the connection, or identification information of the UE before the first node reestablishes the connection or when a connection failure occurs.

In an exemplary embodiment of the eleventh or twelfth aspect of the present disclosure, the information of the serving cell of the UE accessing the first node includes at least one of: identification information of one or more cells serving the UE before the first node reestablishes the connection or when a connection failure occurs, or identification information of one or more cells serving the UE after the first node reestablishes the connection.

In an exemplary embodiment of the eleventh or twelfth aspect of the present disclosure, the first node is a relay node or a DU of the relay node, and the second node is an anchor node or a central unit (CU) of the anchor node.

According to a thirteenth aspect of the present disclosure, a method performed at a fifth node for reestablishing a connection is provided. The method includes: transmitting a reestablishment trigger message to a user equipment (UE); and performing a reestablishment process with the UE.

According to a fourteenth aspect of the present disclosure, a method performed at a user equipment (UE) for reestablishing a connection is provided. The method includes: receiving a reestablishment trigger message from a fifth node; and initiating a reestablishment process according to the reestablishment trigger message.

In an exemplary embodiment of the thirteenth aspect or the fourteenth aspect of the present disclosure, the reestablishment trigger message includes at least one of: indication information for indicating the UE to initiate the reestablishment process, indication information for indicating that a connection failure occurs at a relay node connected to the UE, identification information of a cell the UE is accessing when performing the reestablishment, or information related to random access resources used by the UE when performing the reestablishment.

In an exemplary embodiment of the thirteenth aspect or the fourteenth aspect of the present disclosure, the fifth node includes at least one of: a relay node, a distributed unit (DU) of the relay node, an anchor node, or a central unit (CU) of the anchor node.

According to a fifteenth aspect of the present disclosure, a first node is provided. The first node includes: a processor; and a memory storing computer-executable instructions that, when executed by the processor, cause the processor to execute the method of any of the first, fifth, seventh, ninth, and eleventh aspects according to the present disclosure.

In an exemplary embodiment of the fifteenth aspect of the present disclosure, the first node is a relay node or a distributed unit (DU) of the relay node.

According to a sixteenth aspect of the present disclosure, a second node is provided. The second node includes: a processor; and a memory storing computer-executable instructions that, when executed by the processor, cause the processor to execute the method of any of the second, sixth, eighth, tenth and twelfth aspects according to the present disclosure.

In an exemplary embodiment of the sixteenth aspect of the present disclosure, the second node is an anchor node or a central unit (CU) of the anchor node.

According to a seventeenth aspect of the present disclosure, a third node is provided. The third node includes: a processor; and a memory storing computer-executable instructions that, when executed by the processor, cause the processor to execute the method of the third aspect according to the present disclosure.

In an exemplary embodiment of the seventeenth aspect of the present disclosure, the third node is an anchor node or a CU of the anchor node connected to a relay node when the connection is being reestablished.

According to an eighteenth aspect of the present disclosure, a fourth node is provided. The third node includes: a processor; and a memory storing computer-executable instructions that, when executed by the processor, cause the processor to execute the method of the fourth aspect according to the present disclosure.

In an exemplary embodiment of the eighteenth aspect of the present disclosure, the fourth node is an anchor node or a CU of the anchor node connected to the relay node before the connection is reestablished or when a connection failure occurs.

According to a nineteenth aspect of the present disclosure, a fifth node is provided. The fifth node includes: a processor; and a memory storing computer-executable instructions that, when executed by the processor, cause the processor to execute the method of the thirteenth aspect according to the present disclosure.

In an exemplary embodiment of the nineteenth aspect of the present disclosure, the fifth node includes at least one of: a relay node, a distributed unit (DU) of the relay node, an anchor node, or a central unit (CU) of the anchor node.

According to a twentieth aspect of the present disclosure, a user equipment, UE, is disclosed. The UE may include: at least one processor; and a memory storing computer-executable instructions that, when executed by the at least one processor, cause the at least one processor to execute the method of the fourteenth aspect according to the present disclosure.

According to a twenty-first aspect of the present disclosure, there is provided a computer-readable medium having stored thereon instructions which, when executed by a processor, cause the processor to execute the method of any of the first to fourteenth aspects according to the present disclosure.

According to the technical solution of the present disclosure, after the connection failure at the relay node occurs, the reestablishment process at the relay node can be completed, and the reestablishment process at UEs accessing the relay node can be completed or the connections between these UEs and the relay node can be maintained, so as to ensure that the connection between the relay node and the network and the connection between the UE and the network, and avoid unnecessary interruption of service of the UE.

MODE FOR THE INVENTION

Embodiments of the present disclosure are described in detail below, examples of which are illustrated in the accompanying drawings, in which the same or similar reference numerals denote the same or similar elements or elements having the same or similar functions throughout. The embodiments described below with reference to the accompanying drawings are exemplary and are intended to explain the present disclosure, and should not be construed as limiting the present disclosure.

As can be understood by those skilled in the art, the singular forms "a," "an," "said" and "the" used herein may also include the plural form, unless specifically stated. It is to be further understood that the word "including" used in the specification of the disclosure means that features, integers, steps, operations, elements and/or components are present, not excluding the existence or adding of one or more other features, integers, steps, operations, elements, components and/or groups thereof. It should be understood that when an element is referred to as being "connected" or "coupled" to another element, it can be directly connected or coupled to the another element, or there may be an intermediate element there between. Further, "connect" or "couple" used herein may include either a wireless connection or a wireless coupling. The term "and/or" used herein includes all or any of the elements of one or more associated listed items, and all combinations thereof.

Those skilled in the art will appreciate that all terms (including technical and scientific terms) used herein have the same meaning as commonly understood by one with ordinary skills in the art to which this disclosure belongs, unless specifically stated. It should also be understood that terms such as those defined in a general dictionary should be understood to have meaning consistent with the meaning in the context of the prior art, and will not be explained in an idealized or excessive formal way, unless specifically defined as here.

Those skilled in the art can understand that "terminal" and "terminal device" as used herein include both wireless signal receiver devices, which are devices with only wireless signal receivers that do not have transmission capabilities, as well devices having receiving and transmitting hardware, which are devices having receiving and transmitting hardware for two-way communication on a two-way communication link. Such a device may include: cellular or other communication devices, which has a single-line display or multi-line display, or has no multi-line display; PCS (Personal Communications Service), which may combine the voice, data processing, fax and/or data communication capabilities; PDA (Personal Digital Assistant), which may include RF receivers, pagers, Internet/Intranet access, web browsers, notepads, calendars, and/or GPS (Global (Positioning System) receivers; conventional laptop and/or palmtop computers or other devices having and/or including conventional laptop and/or palmtop computer or other devices including a radio frequency receiver. The "terminal", "terminal device" as used herein may be portable, transportable, installed in a vehicle (for aviation, shipping and/or land freight), or suitable and/or configured to operate locally, and/or operating at any other location on the Earth and/or in space in a distributed fashion. The "terminal" and "terminal device" used herein may also be communication terminals, Internet terminals, music/video playback terminals, such as PDA, MID (Mobile Internet Device), and/or mobile phones with music/video playback functions, or may also be devices such as smart TVs, set-top boxes and the like.

The research of the Integrated Access and Backhaul (IAB) project in 5G networks may aim to build a multi-hop network architecture to extend the coverage of the network. Taking as an example, as shown in FIG. 1, the network may include an anchor node (IAB donor node) and two relay nodes (IAB node). Some UEs (such as UE1) may communicate directly with the anchor node via a wireless link. Some UEs may be connected to the relay node via a wireless link, and may finally communicate with the anchor node via wireless links between the relay nodes (such as UE2 may communicate with the anchor node through relay node 1, and UE3 may communicate with the anchor node though relay node 2 and relay node 1). In this architecture, the anchor node may be a base station consisting of a central unit (CU) and a distributed unit (DU), or the anchor node may be a complete base station. The central unit and the distributed unit may communicate through a F1 interface. The CU may have at least radio resource control (RRC) and packet data convergence protocol (PDCP) layers, and may also include a service data adaptation protocol (SDAP) layer. The DU may have radio link control protocol (RLC), medium access control (MAC), and physical layers, etc. Between the CU and the DU may be a standardized public interface F1. The F1 interface may be divided into a control plane F1-C and a user plane F1-U. The transmission network layer of F1-C may be based on IP transmissions. In order to transmit signaling more reliably, a SCTP protocol may be added over IP. The application layer protocol may be F1AP. The SCTP can provide the reliable application layer messaging. The transport layer of F1-U may be UDP/IP, and GTP-U may be over UDP/IP for carrying the user plane protocol data unit, PDU. Each relay node may include two parts: a distributed unit part (DU) and a mobile terminal part (Mobile terminal, MT). The distributed unit part may include only part of the protocol stack, such as radio link control (RLC), medium access control (MAC), physical layers, etc. The mobile terminal part may include a complete protocol stack. For example, the control plane may include RRC/PDCP/RLC/MAC/PHY, and the user plane may include SDAP/PDCP/RLC/MAC/PHY. The mobile terminal part can access the network as a UE. The UE can access the network through any relay node, and can also access the network through the anchor node.

The relay node will access the network through a superior node (parent node), and the superior node may be another relay node or an anchor node. As shown in FIG. 1, relay node 2 may access the network through relay node 1. Relay node 1 can be considered as the superior node of relay node 2. Relay node 1 may be directly connected to the anchor node, so the anchor node may be the superior node of relay node 1. In an actual network, there will be a case where a relay node reconnects to the network after losing its connection to the network, that is, a reestablishment process at the relay node. Specifically, if a relay node fails to connect to a superior node 1 (due to, for example, a wireless link failure, handover failure, reconfiguration failure, etc.), it will look for a new superior node (not shown) or the same superior node (such as the superior node 1) to reestablish the connection in order to continue serving the UE which accesses the relay node. This reestablishment process may include three situations:

1. The relay node may reestablish the connection with the old anchor node, the old anchor node being the anchor node to which the relay node was connected before the connection reestablishment;
2. The relay node may reestablish the connection with a new anchor node; the new anchor node may be not the same node as the anchor node to which the relay node was connected before the connection reestablishment, but the new anchor node may acquire a context of the relay node from the old anchor node by a context request process;
3. The relay node may reestablish the connection with a new anchor node; the new anchor node may be not the same node as the anchor node to which the relay node was connected before the connection reestablishment, and the new anchor node cannot acquire a context of the relay node from other anchors node.

During the connection reestablishment process, the relay node may be required to perform the reestablishment for the contexts of the DU part and the MT part of the relay node, so as to ensure that the relay node, after accessing the network, can continue serving the UE which accesses the relay node.

However, the design of the prior art solution mainly may consider how a UE reconnects with the network, and it does not take the connection reestablishment process of the relay node into account, especially how to complete the reestablishment process with the DU part of the relay node and the reestablishment process with the UE accessing the DU part.

The present disclosure may be mainly directed to the following five aspects: (1) Reestablishment at the MT part of a relay node (2) Inter-base station context acquisition (3) Interface management between the DU of the relay node and the anchor node (or the CU of the anchor node) (4) UE context management between the relay node and the anchor node (or the CU of the anchor node) (5) Trigger for UE to reestablish a connection The processes involved in the present disclosure may be processes performed after a connection failure occurs at the relay node.

In the present disclosure, the anchor node may represent a 5G base station, or a 5G base station including a CU and a DU, or a central unit of a 5G base station.

In the present disclosure, a message transmitted between two nodes or a process performed between two nodes may be performed through a link directly connected between the two nodes, or may be performed via one or more other nodes between the two nodes.

Message names in this disclosure are only examples, and other names may also apply.

In this disclosure, the context of the UE, the context of the DU part of the relay node, and the context of the MT part of the relay node will be used. The three kinds of context may contain information as follows:

1. the context of the UE (hereinafter referred to as UE context), see information contained in the Retrieve UE Context Response message in TS38.423, or information contained in the Retrieve UE Context Response message in TS36.423, where the UE may be a UE accessing the relay node, or a UE accessing the anchor node, and the context may include at least one of: (1) identification information of the UE, such as cell radio network temporary identification (C-RNTI), identification information of the UE on the F1 interface (such as gNB-CU UE F1AP ID, and/or gNB-DU UE F1AP ID), identification information of the UE at the relay node (such as IAB node UE ID), identification information of the UE at the anchor node (such as IAB donor UE ID), etc. The identification information may be one piece of identification information of the UE, or multiple pieces of identification information of the UE, etc. (2) security capabilities of the UE (3) AS domain security information (4) UE Aggregate Maximum Bit Rate (5) information related to one or more PDU sessions established by the UE, where, for a PDU session, the information includes information related to QoS flows (such as QoS flow indicator, QoS related information, etc.) (6) information related to one or more data radio bearers (DRBs) established by the UE, where, for a DRB, the information includes information related to DRB QoS, information related to QoS flows included in the DRB (such as QoS parameters for a QoS flow), etc. (7) information related to one or more SRBs established by the UE, where, for a SRB, the information includes, for example, identification information of the established SRB (8) information related to one or more cells serving the UE, where, for a cell, this information includes, for example, cell identification information (SpCell identification information, PCell identification information, PSCell identification information, SCell identification information, etc.), cell frequency information, cell bandwidth information, multiplexing mode information for a cell (such as TDD, FDD), and cell measurement related information (such as MeasurementTimingConfiguration) (9) context information related to the RRC of the UE, such as CellgroupConfig, RadioBearerConfig, which may refer to the content of the RRCReconfig message or the content of HandoverPreparationInformation in TS38.331.
2. The context of the MT part of the relay node (hereinafter referred to as MT context) may include at least one of: (1) relevant information defined in the above "UE context", this information may be for the MT part of the relay node (2) information related to the backhaul link channel served by the MT part, wherein the backhaul link channel may refer to a channel established between two relay nodes for carrying data of one DRB or SRB of one UE, or data of multiple DRBs or SRBs of one UE, or data of multiple DRBs or SRBs of multiple UEs, and the information may include at least one of: 1) identification information of the backhaul link channel 2) information related to the QoS of the backhaul link channel 3) identification information of the UE to which the data carried on the backhaul link belongs 4) identification information of the DRB to which the data carried on the backhaul link belongs 5) information related to the QoS of the DRB to which the data carried on the backhaul link belongs 6) information related to the QoS flow contained in the DRB to which the data carried on the backhaul link belongs, such as QoS flow indicator, QoS related information, etc. 7) identification information of the SRB to which the data carried on the backhaul link belongs 8) For information related to the configuration of the backhaul link channel served by the MT part, please refer to related information in CellGroupConfig in TS38.331.
3. The context of the DU part of the relay node (hereinafter referred to as DU context) includes at least one of:
    (1) Non-UE related context (hereinafter referred to as DU context (non-UE)), wherein this information includes at least one of: 1) identification information/name information of the DU part of the relay node, such as gNB-DU ID/Name, IAB node DU ID/Name 2) identification information/name information of the relay node, such as IAB node ID/Name 3) identification information/name information of an anchor node connected to the relay node, such as gNB/gNB-CU/IAB Donor/IAB donor-CU ID/Name 4) information of an activated cell, such as identification information of the cell, wherein the information may include information of at least one cell 5) information of a deactivated cell, such as identification information of the cell, wherein the information may include information of at least one cell 6) Information related to a cell served by the DU part of the relay node, where, for a cell, the information includes at least one of: a) cell characteristics related information, which includes at least one of: cell identification, cell frequency information, cell bandwidth information, multiplexing mode information of a cell (such as TDD, FDD), and cell measurement related information (such as MeasurementTimingConfiguration), system information of the DU side (such as MIB, SIB1) and system information of the CU side (other SIBs, such as SIB2, SIB3, . . . , see TS38.331) for the cell, information related to a list of supported PLMNs, etc. For specific contents, please refer to Served Cell Information, gNB-DU System Information, gNB-CU system information, Available PLMN List in TS38.473 b) cell status related information, such as activation, deactivation, switch-off ongoing, etc. For details, please refer to Cell Status List in TS38.473 7) address related information (or TNL association related information), which includes at least one of: a) information related to anchor node side Transport Network Layer Association (TNLA: TNL association), wherein for a TNLA, this information includes at least one of: 1) CU/anchor node side transport layer address information (such as IP address); 2) indication information for indicating whether the TNLA (or the address) is used to transmit UE associated messages or non-UE associated messages, see TNL Association Transport Layer, TNL association Usage in TS38.473; 3) Stream identifier related information; and 4) identification information of one or more UEs targeted by the TNLA, such as C-RNTI, identification information of the UE on the F1 interface (such as gNB-CU UE F1AP ID, and/or gNB-DU UE F1AP ID), identification information of the UE at the relay node (such as IAB node UE ID), identification information of the UE at the anchor node (such as IAB donor UE ID), and so on. This information is used for the transmission of control plane messages between the relay node and the anchor node. b) information related to relay node side Transport Network Layer Association (TNLA), wherein for a TNLA, this information includes at least one of: 1) DU/relay node side transport layer address information (such as IP address); 2) indication information for indicating whether the TNLA (or the address) is used to transmit UE associated messages or non-UE associated messages, see TNL Association Transport Layer, TNL association Usage in TS38.473; 3) Stream identifier related information; and 4) identification information of one or more UEs targeted by the TNLA, such as C-RNTI, identification information of the UE on the F1 interface (such as gNB-CU UE F1AP ID, and/or gNB-DU UE F1AP ID), identification information of the UE at the relay node (such as IAB node UE ID), identification information of the UE at the anchor node (such as IAB donor UE ID), and so on. This information may be used for the transmission of control plane messages between the relay node and the anchor node. Further, the information of the anchor node and the relay node sides need to be used together to represent a TNLA. 8) For RRC version information of the distributed unit of the relay node, see gNB-DU RRC version in TS38.473 for details 9) For RRC version information of the anchor node, see gNB-CU RRC version in TS38.473 for details, wherein the anchor node is an anchor node that is connected to the relay node currently or before the relay node reestablishes the connection (or before a connection failure occurs) 10) For information related to barred cells, such as cell identification, see Cells to be barred List in TS38.473 11) For information related to protected E-UTRA resources, see Protected E-UTRA Resource List in TS38.473 12) For information related to resource coordination, see related content in gNB-DU Resource Coordination Request/Response messages in TS38.473 13) For information related to the DU load status, such as overload and nonoverload, see gNB-DU Status indication message in TS38.473
    (2) UE related context (hereinafter referred to as DU context (UE)), wherein this information includes at least one of: 1) For information related to the context of the UE accessing the DU, see related information defined by the above "UE context" for details 2) For information related to the backhaul link served by the DU, see "information related to the backhaul link channel served by the MT part" as defined in the above "MT context."

In order to make the purpose, technical means, and advantages of the present disclosure clearer, various aspects of the present disclosure are described in further detail below with reference to the drawings.

First Aspect: The Reestablishment at the MT Part of the Relay Node

Hereinafter, a method performed at a first node for reestablishing a connection according to an exemplary embodiment of the present disclosure will be described in detail with reference to FIG. 2. Here, the first node may be a relay node or a DU of the relay node, and a second node to be mentioned below may be an anchor node or a CU of the anchor node. It should be understood that the second node connected to the first node when the connection is reestablished may be the second node (e.g., the old second node) accessed by the first node before the reestablishment (before a connection failure occurs), or a new second node.

Figure 2:
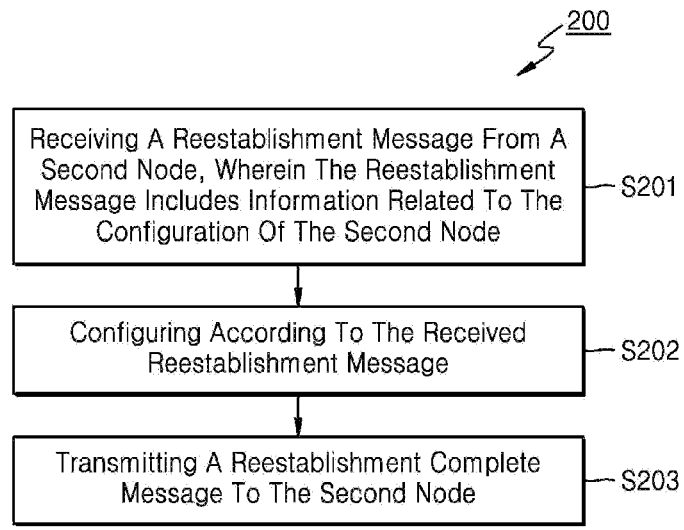
FIG. 2 schematically illustrates a flowchart of a method performed at a first node for reestablishing a connection according to an exemplary embodiment of the present disclosure.

FIG. 2 schematically illustrates a flowchart of a method 200 performed at a fifth node for reestablishing a connection according to an exemplary embodiment of the present disclosure. As shown in FIG. 2, the method 200 may include steps S201 to S203. In step S201, the first node may receive a reestablishment message from the second node. The reestablishment message may include information related to the configuration of the second node.

The information related to the configuration of the second node may include at least one of:
- identification information of the second node,
- indication information for indicating whether the second node is a node (the old second node) to which the first node was connected before the first node reestablishes the connection or when a connection failure occurs,
- indication information for indicating whether an F1 interface needs to be established between the second node and the first node; further, the F1 interface may be an F1 interface between a CU of the second node and a DU of the first node,
- indication information for indicating whether the second node has obtained a non-UE related DU context (DU context (non-UE)) and a UE related DU context (DU context (UE)) of the first node,
- indication information for indicating whether the second node has obtained a non-UE related DU context (DU context (non-UE)) of the first node,
- indication information for indicating whether the second node has obtained a DU context (DU context (UE)) related to a UE accessing the first node,
- address related information of the second node side, where, further, the address related information may be address related information of the CU side of the second node,
- address related information of the second node side for data transmission between the first node and the second node before the first node reestablishes the connection or when a connection failure occurs,
- address related information of the first node side, where, further, the address related information may be address related information of the distributed unit side of the first node,
- address related information of the first node side for data transmission between the first node and the second node before the first node reestablishes the connection or when a connection failure occurs.

In step S202, the first node may configure the first node according to the received reestablishment message.

In step S203, the first node may transmit a reestablishment complete message to the second node.

The execution order of the above steps S202 and S203 may be interchanged. In addition, before step S201, the method may further include transmitting, by the first node, a reestablishment request message to the second node.

Further, after receiving the information in step S201, the relay node may determine whether the interface (such as the F1 interface) connection established between the distributed unit of the first node and the central unit of the second node can be reused. If the connection between the distributed unit of the first node and the central unit of the second node can be reused, there may be no need to reestablish an interface connection between the distributed unit of the first node and the central unit of the second node (for example, establishing a F1 interface by the setup process of the F1 interface again).

Figure 3:
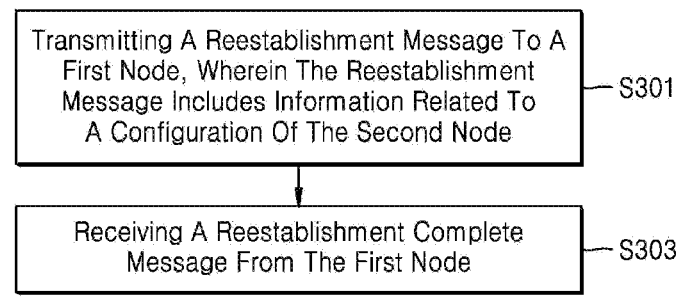
FIG. 3 schematically illustrates a flowchart of a method performed at a second node for reestablishing a connection according to an exemplary embodiment of the present disclosure.

Accordingly, FIG. 3 schematically illustrates a method 300 performed at a second node for reestablishing a connection according to an exemplary embodiment of the present disclosure. As shown in FIG. 3, the method 300 may include steps S301 to S303.

In step S301, the second node may transmit the above-mentioned reestablishment message to the first node.

In step S302, the second node may perform connection reestablishment with the first node according to the reestablishment message.

In step S303, the second node may receive the above-mentioned reestablishment complete message from the first node.

The execution order of the above steps S302 and S303 may be interchanged. In addition, before step S301, the method may further include receiving, by the second node, a reestablishment request message transmitted from the first node.

A signaling flow for reestablishing a connection according to an exemplary embodiment of the present disclosure may be described below with reference to FIG. 4, in which a relay node may be used as an example of the first node, and the relay node may perform the method 200 described with reference to FIG. 2, while an anchor node may be used as an example of the second node, and the anchor node may perform the method 300 described with reference to FIG. 3, see the foregoing description for FIGS. 2 and 3 for details.

Figure 4:
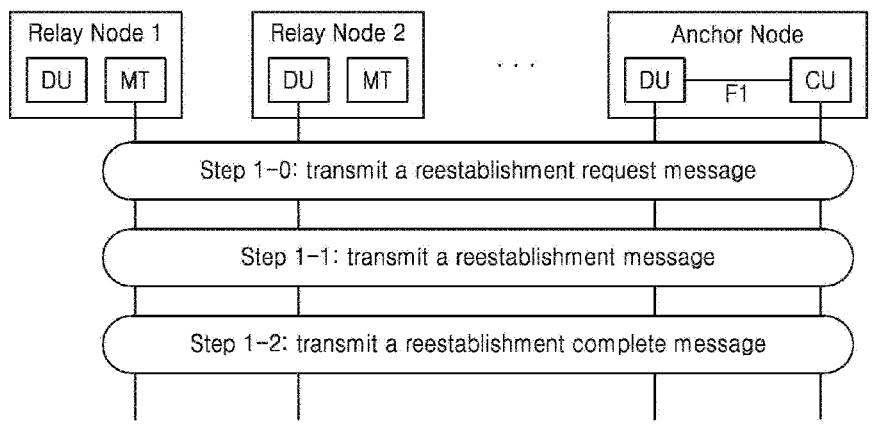
FIG. 4 schematically illustrates a signaling flowchart for reestablishing a connection according to an exemplary embodiment of the present disclosure.

As shown in FIG. 4, the signaling flow may include the following steps:

Step 1-0: The relay node 1 may transmit a reestablishment request message to the anchor node, see the content of the RRCReestablishmentRequest message in TS38.331 for the content contained in this message, wherein this message can be transmitted to the anchor node directly or through one or more nodes (or relay nodes)

Step 1-1: the anchor node may transmit a reestablishment message to the relay node1, the reestablishment message including information related to the configuration of the anchor node, and the information may include at least one of:
- contents in the existing reestablishment message, see the RRCReestablishment message in TS38.331,
- identification information of the anchor node, such as gNB ID, gNB-CU ID, IAB Donor ID, IAB Donor CU ID, wherein the anchor node is an anchor node that received the reestablishment request message in step 1-0,
- indication information for indicating whether the anchor node is a node (the old anchor node) to which the relay node was connected before the relay node reestablishes a connection or when a connection failure occurs,
- indication information for indicating whether the F1 interface needs to be established, wherein the indication information indicates whether the relay node or the distributed unit of the relay node needs to establish the F1 interface,
- indication information for indicating whether the DU context has be obtained, wherein the indication information indicates whether the anchor node has obtained the DU context (non-UE) and DU context (UE) of the relay node,
- indication information for indicating whether the DU context (non-UE) has be obtained, wherein the indication information indicates whether the anchor node has obtained the DU context (non-UE) of the relay node,
- indication information for indicating whether the DU context (UE) has be obtained, wherein the indication information indicates whether the anchor node has obtained the DU context (UE) accessing the relay node,
- address related information of the anchor node side, such as CU/anchor node side transport layer address information (such as IP address), information related to SCTP stream identifier, wherein the address information can be used for the data transmission between the relay node or a distributed unit of the relay node and the anchor node or a central unit of the anchor node address related information of the old anchor node side, such as CU/anchor node side transport layer address information (such as IP address), information related to SCTP stream identifier, wherein the address information is used for the data transmission between the relay node or a distributed unit of the relay node and the anchor node or a central unit of the anchor node, before the relay node reestablishes a connection or when a connection failure occurs, address related information of the relay node side, such as DU/relay node side transport layer address information (such as IP address), information related to SCTP stream identifier, wherein the address information can be used for the data transmission between the relay node or a distributed unit of the relay node and the anchor node or a central unit of the anchor node, old address related information of the relay node side, such as DU/relay node side transport layer address information (such as IP address), information related to SCTP stream identifier, wherein the address information may be used for the data transmission between the relay node or a distributed unit of the relay node and the anchor node or a central unit of the anchor node, before the relay node reestablishes a connection or when a connection failure occurs.

The reestablishment message may be directly transmitted to the relay node 1 by the anchor node; or it may be transmitted to the distributed unit of the anchor node by the CU of the anchor node, and then transmitted to the relay node 1 by the distributed unit of the anchor node; or it may be transmitted to distributed unit of other relay node by the anchor node, and then transmitted to the relay node 1 by the distributed unit of the other relay node. The above information can also be transmitted, by the anchor node, to a distributed unit of a superior node accessed by relay node 1 as an IE in a message (such as DL RRC Message Transfer) on the F1 interface, and then transmitted to the relay node 1 by the distributed unit of the superior node.

Step 1-2: The relay node 1 may transmit a reestablishment complete message to the anchor node, see the content of the RRCReestablishmentComplete message in TS38.331 for the content contained in this message, wherein this message can be transmitted to the anchor node directly or through one or more nodes (or relay nodes).

According to the above-mentioned exemplary embodiment of the present disclosure for the first aspect, the MT part of the relay node may reestablish the connection, and can determine how to perform the setup process for the interface between the DU of the relay node and the CU in the anchor node.

Second Aspect: Inter-Base Station Context Acquisition

This process may mainly implement the Inter-base station acquisition for the MT context and the DU context of the relay node and the UE context of the UE accessing the DU of the relay node.

Hereinafter, a method performed at a third node for acquiring a context according to an exemplary embodiment of the present disclosure will be described in detail with reference to FIG. 5. The third node here may be an anchor node or a CU of the anchor node connected to the relay node when reestablishing a connection (i.e. a new anchor node), and a fourth node mentioned below may be an anchor node or a CU of the anchor node connected to the relay node before the connection is reestablished or when a connection failure occurs (i.e. the old anchor node).

Figure 5:
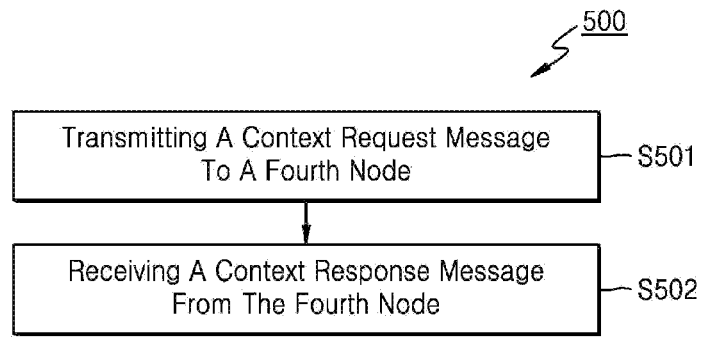
FIG. 5 schematically illustrates a flowchart of a method performed at a third node for acquiring a context according to an exemplary embodiment of the present disclosure.

FIG. 5 schematically illustrates a flowchart of a method 500 performed at a third node for acquiring a context according to an exemplary embodiment of the present disclosure.

As shown in FIG. 5, the method 500 includes steps S501 to S502. In step S501, the third node may transmit a context request message to a fourth node.

The context request message may include at least one of: information related to the MT part of a relay node, information related to the DU part of the relay node, information related to a user equipment (UE) served by the DU part of the relay node, or type information of a requested context.

Specifically, the information related to the MT part of the relay node may include at least one of: identification information used by the MT part of the relay node before a connection reestablishment is initiated or when a connection failure occurs, identification information of a cell that was accessed by the MT part of the relay node before a connection reestablishment is initiated or when a connection failure occurred, or an authentication token (shortMAC-I) used by the MT part of the relay node before a connection reestablishment is initiated or when a connection failure occurs.

Specifically, the information related to the DU part of the relay node may include at least one of: identification information/name information used by the DU part of the relay node before the relay node initiates a connection reestablishment or when a connection failure occurs, identification information used by the relay node before a connection is reestablished or when a connection failure occurs, identification information used by an anchor node, which was connected before the relay node reestablishes a connection or when a connection failure occurs, or a CU of the anchor node, address related information of the anchor node side (the old anchor node side) connected to the DU part of the relay node before the relay node reestablishes a connection or when a connection failure occurs, or address related information of the DU side used by the DU part the relay node to connect the anchor node before the relay node reestablishes a connection or when a connection failure occurs.

Specifically, the information related to a UE served by the DU part of the relay node may include at least one of: identification information of the UE served by the DU part of the relay node, identification information of a cell accessed by the UE served by the DU part of the relay node, shortMAC-I used by the UE served by the DU part of the relay node, identification information used by the UE served by the DU part of the relay node before the MT part of the relay node initiates a connection reestablishment or when a connection failure occurs, identification information of a cell accessed by the UE served by the DU part of the relay node before the MT part of the relay node initiates a connection reestablishment or when a connection failure occurs, or shortMAC-I used by the UE served by the DU part of the relay node before the MT part of the relay node initiates a connection reestablishment or when a connection failure occurs.

In step S502, the third node may receive a context response message from the fourth node.

The content of the context response message corresponds to the content of the context request message, and may include at least one of: information of the relay node related to a backhaul link channel served by the MT part, or DU-related context of the relay node.

Specifically, the DU-related context of the relay node may include at least one of: a non-UE related DU context of the relay node, or a UE related DU context of the relay node.

Figure 6:
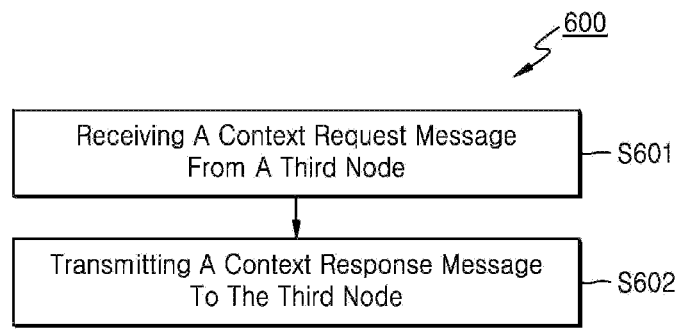
FIG. 6 schematically illustrates a flowchart of a method performed at a fourth node for acquiring a context according to an exemplary embodiment of the present disclosure.

Accordingly, FIG. 6 schematically illustrates a method 600 performed at a fourth node for acquiring a context according to an exemplary embodiment of the present disclosure.

As shown in FIG. 6, the method 600 may include steps S601 to S602.

In step S601, the fourth node may receive the above-mentioned context request message from a third node.

In step S602, the fourth node may transmit the above-mentioned context response message to the third node, and the content of the context response message may correspond to the content of the context request message.

A signaling flow for acquiring a context according to an exemplary embodiment of the present disclosure may be described below with reference to FIG. 7, in which the base station 1 (new anchor node), which is connected to the relay node when a connection is reestablished, is used as an example of the third node mentioned above, and the base station 1 may perform the method 500 described with reference to FIG. 5; while the base station 2, which is connected to the relay node before a connection is reestablished (or when a connection failure occurs), is used as an example of the fourth node mentioned above, and the base station 2 may perform the method 600 described with reference to FIG. 6, see the foregoing description for FIGS. 5 and 6 for details.

Figure 7:
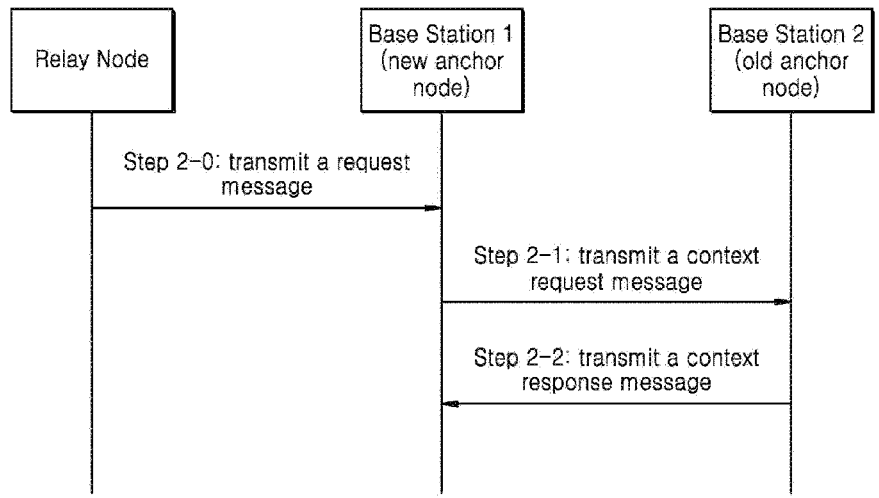
FIG. 7 schematically illustrates a signaling flowchart for acquiring a context according to an exemplary embodiment of the present disclosure.

As shown in FIG. 7, the signaling flow may include the following steps:

Step 2-1: The base station 1 may transmit a context request message to the base station 2, wherein the message may provide the base station 2 with assistant information needed to find the context of the relay node, and the message may include at least one of:

(1) information related to the MT part of the relay node, which may include at least one of:
   identification information of the MT part of the relay node, such as C-RNTI, wherein the identification information may be identification information used by the MT part of the relay node before the connection reestablishment is initiated (or when a connection failure occurs). In an embodiment, for the mobility failure or the reconfiguration with sync failure, the C-RNTI may be the C-RNTI of the MT in the source PCell. In another embodiment, for other MT failures, the C-RNTI may be the C-RNTI in the primary cell (PCell) wherein the MT may be located when an event triggering the reestablishment occurs
   identification information of the cell accessed by the MT part of the relay node, such as PCI and NR CGI, wherein the identification information may be identification information of the cell accessed by the MT part of the relay node before the connection reestablishment is initiated (or when a connection failure occurs). In an embodiment, for the mobility failure or the reconfiguration with sync failure, the cell identifier may be the identifier of the source PCell where the MT is located. In another embodiment, for other MT failures, the cell identifier may be the identifier of the primary cell (PCell) where the MT may be located when an event triggering the reestablishment occurs
   shortMAC-I used by the MT part of the relay node, see information contained in RRCReestablishmentRequest in TS38.331 for details.

(2) information related to the DU part of the relay node, which may include at least one of:
   old identification information/name information of the DU part of the relay node, such as old gNB-DU ID, old IAB node DU ID, old gNB-DU Name, and old IAB node DU Name, wherein in one embodiment, the identification information may be identification information/name information used by the distributed unit of the relay node before the relay node reestablishes a connection (or when a connection failure occurs)
   old identification information of the relay node, such as old IAB node ID, wherein in one embodiment, the identification information may be identification information used by the relay node before the relay node reestablishes a connection (or when a connection failure occurs)
   identification information of the old anchor node (or the CU of this anchor node) to which the relay node is connected, such as old gNB/gNB-CU/IAB Donor/IAB donor CU ID. In one embodiment, the identification information may be identification information used by the anchor node (or the CU of the anchor node) to which the relay node may be connected before the relay node reestablishes a connection (or when a connection failure occurs)
   old address information of the anchor node side which is used by the DU part of the relay node, such as CU/anchor node side transport layer address information (such as IP address), information related to SCTP stream identifier, wherein the information may be address information of the anchor node side connected to the DU part of the relay node before the relay node reestablishes a connection (or when a connection failure occurs). The anchor node connected to the DU part of the relay node before the relay node reestablishes a connection (or when a connection failure occurs) uses such address to performs data transmission with the DU part of the relay node
   old address information of the DU side which is used by the DU part of the relay node, such as DU/relay node side transport layer address information (such as IP address), information related to SCTP stream identifier, wherein the information may be address information of the DU side by which the DU part of the relay node may connect to the anchor node before the relay node reestablishes a connection (or when a connection failure occurs) The anchor node connected to the DU part of the relay node before the relay node reestablishes a connection (or when a connection failure occurs) uses such address to performs data transmission with the DU part of the relay node (3) information related to the UE served by the DU part of the relay node, which may include at least one of:
   identification information of the UE served by the DU part of the relay node, such as C-RNTI, wherein the identification information may be identification information used before the UE initiates the connection reestablishment (or when a connection failure occurs). In an embodiment, for the mobility failure or the reconfiguration with sync failure, the C-RNTI may be the C-RNTI of the UE in the source PCell. In another embodiment, for other UE failures, the C-RNTI may be the C-RNTI in the primary cell (PCell) where the UE is located when an event triggering the reestablishment occurs identification information of the cell accessed by the UE served by the DU part of the relay node, such as PCI and NR CGI, wherein the identification information may be identification information of the cell accessed by the UE before the connection reestablishment is initiated (or when a connection failure occurs). In an embodiment, for the mobility failure or the reconfiguration with sync failure, the cell identifier may be the identifier of the source PCell where the UE is located. In another embodiment, for other UE failures, the cell identifier may be the identifier of the primary cell (PCell) where the UE is located when an event triggering the reestablishment occurs shortMAC-I used by the UE served by the DU part of the relay node, see information contained in RRCReestablishmentRequest in TS38.331 for details.

identification information used by the UE served by the DU part of the relay node before the MT part of the relay node initiates a connection reestablishment (or when a connection failure occurs), such as C-RNTI identification information of a cell accessed by the UE served by the DU part of the relay node before the MT part of the relay node initiates a connection reestablishment (or when a connection failure occurs), such as PCI and NR CGI shortMAC-I used by the UE served by the DU part of the relay node before the MT part of the relay node initiates a connection reestablishment (or when a connection failure occurs), see information contained in RRCReestablishmentRequest in TS38.331 for details.

(4) type information of the requested context, wherein possible types may be MT context, DU context (non-UE), DU context (UE), DU context, etc., and the type information can indicate at least one or more of the above types Step 2-2: the base station 2 may transmit a context response message to the base station 1, which is used by the base station 2 to provide the base station 1 with the context related to the relay node, wherein the message may include at least one of: 1) MT context of the relay node, such as information related to a backhaul link channel served by the MT part, or 2) DU-related context of the relay node, which may include at least one of a non-UE related DU context of the relay node, or a UE related DU context of the relay node.

The messages defined in the above steps 2-1 and 2-2 may be messages on the X2 interface or messages on the Xn interface. The "context request message" in step 2-1 may be a Retrieve UE Context Request message, and the "context response message" in step 2-2 may be a Retrieve UE Context Response message, or other messages are possible.

After acquiring the context related to the relay node, the base station 1 may establish a connection with the relay node according to the context. For example, after acquiring the MT context of the relay node, the base station 1 may configure the MT part of the relay node; after acquiring the DU context (non-UE) of the relay node, the base station 1 may establish a connection with the distributed unit of the relay node (such as establishing an F1 interface); and after acquiring the DU context (UE) of the relay node, the base station 1 may configure the users served by the relay node. Further, before step 2-1, the method may further include:

Step 2-0: The relay node may transmit a request message to the base station 1, the request message may be used to provide the base station 1 with the assistant information needed to acquire the context information. For information contained in the message, information provided in the above step 2-1 can be referred to. The information in the request message may be transmitted by the UE accessing the relay node to the relay node, or may be generated by the relay node. The request message may be transmitted to the anchor node by the MT part of the relay node via an RRC message (such as RRCReestablishmentRequest), or by the DU part of the relay node via an F1AP message (such as F1 Setup Request).

Further, the above-mentioned process for Inter-base station context acquisition may also be applied to the process for acquiring the context between a central unit of a base station and a distributed unit of the base station. Specifically, it may include the following steps:

Step 2-$x1$: The central unit of the base station transmits a context request message to the distributed unit of the base station. For information contained in the message, information in the above step 2-1 can be referred to;

Step 2-$x2$: The distributed unit of the base station transmits a context response message to the central unit of the base station. For information contained in the message, information in the above step 2-2 can be referred to Or the following steps:

Step 2-$y1$: The distributed unit of the base station transmits a context request message to the central unit of the base station. For information contained in the message, information in the above step 2-1 can be referred to;

Step 2-$y2$: The central unit of the base station transmits a context response message to the distributed unit of the base station. For information contained in the message, information in the above step 2-2 can be referred to.

The signaling flow may include several implementations as explained below, as shown in FIGS. 8 to 11.

Figure 8:
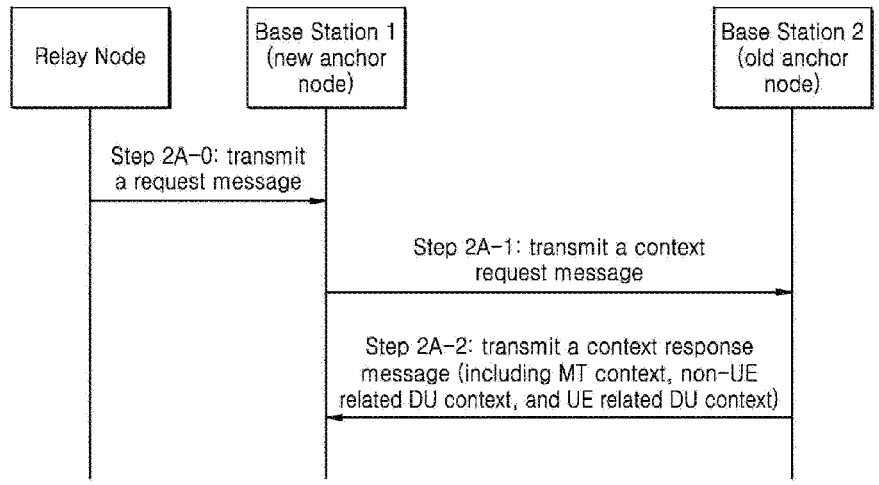
FIGS. 8 to 11 schematically illustrate a signaling flowchart for acquiring a context according to the first to fourth exemplary embodiments of the present disclosure.

FIG. 8 schematically illustrates a signaling flowchart for acquiring a context according to the first exemplary embodiment of the present disclosure.

In this exemplary implementation, the base station 1 may acquire the MT context, the DU context, and the context of the UE served by the DU at one time.

As shown in FIG. 8, the signaling flow may include the following steps:

Step 2A-1: The base station 1 may transmit a context request message to the base station 2. For information contained in the message, information in the above step 2-1 can be referred to;

Step 2A-2: The base station 2 may transmit a context response message to the base station 1. The message may include the MT context of the relay node, the DU context (non-UE) of the relay node, and the DU context (UE) of the relay node.

Further, before step 2A-1, step 2A-0 may be further included, in which the relay node may transmit a request message to the base station 1, and for information contained in the message, the above step 2-0 can be referred to.

Figure 9:
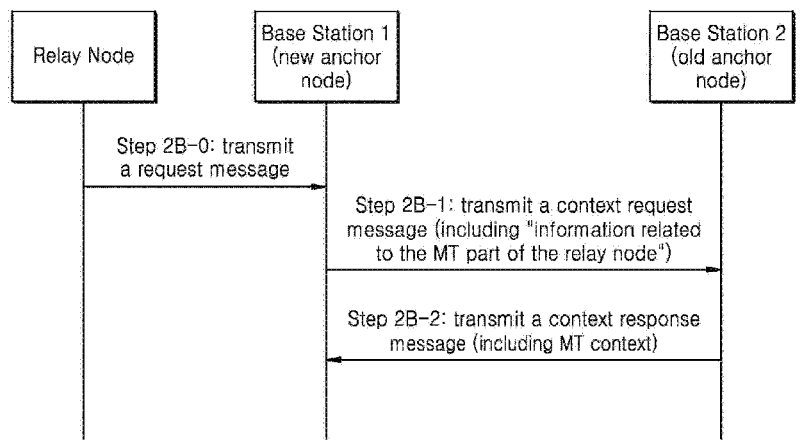

FIG. 9 schematically illustrates a signaling flowchart for acquiring a context according to the second exemplary embodiment of the present disclosure.

In this exemplary implementation, the base station 1 may acquire a part of context, e.g. the relay node MT context.

As shown in FIG. 9, the signaling flow may include the following steps:

Step 2B-1: The base station 1 may transmit a context request message to the base station 2. For information contained in the message, "information related to the MT part of the relay node" provided in the above step 2-1 can be referred to;

Step 2B-2: The base station 2 may transmit a context response message to the base station 1. The message may include the MT context of the relay node.

Further, before step 2B-1, step 2B-0 may be further included, in which the relay node may transmit a request message to the base station 1, and for information contained in the message, the above step 2-0 can be referred to.

Figure 10:
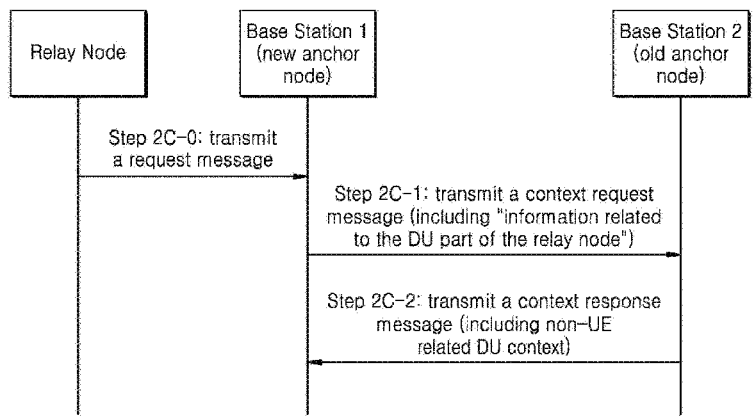

FIG. 10 schematically illustrates a signaling flowchart for acquiring a context according to the third exemplary embodiment of the present disclosure.

In this exemplary implementation, the base station 1 may acquire a part of context, e.g. the relay node DU context (non-UE).

As shown in FIG. 10, the signaling flow may include the following steps:

Step 2C-1: The base station 1 may transmit a context request message to the base station 2. For information contained in the message, "information related to the DU part of the relay node" provided in the above step 2-1 can be referred to;

Step 2C-2: The base station 2 may transmit a context response message to the base station 1. The message may include the DU context (non-UE) of the relay node.

Further, before step 2C-1, step 2C-0 may be further included, in which the relay node may transmit a request message to the base station 1, and for information contained in the message, the above step 2-0 can be referred to.

Figure 11:
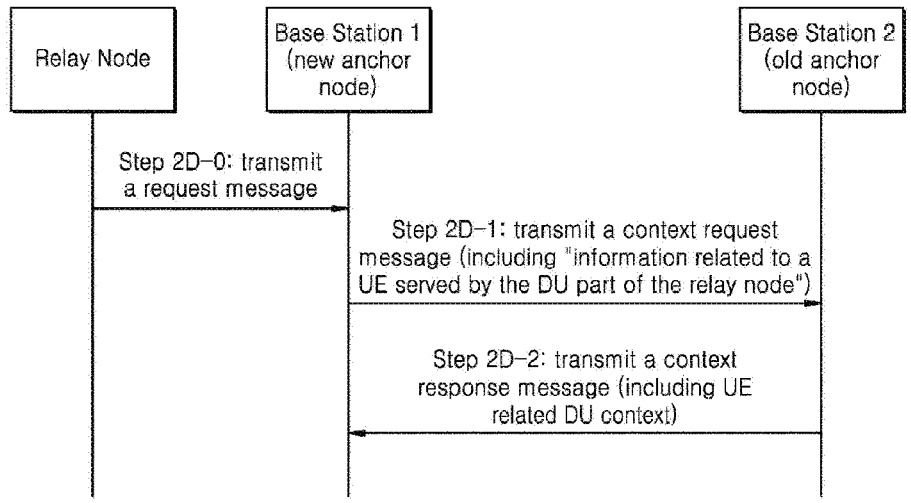

FIG. 11 schematically illustrates a signaling flowchart for acquiring a context according to the fourth exemplary embodiment of the present disclosure.

In this exemplary implementation, the base station 1 may acquire a part of context, e.g. the relay node DU context (UE).

As shown in FIG. 11, the signaling flow may include the following steps:

Step 2D-1: The base station 1 may transmit a context request message to the base station 2. For information contained in the message, "information related to a UE served by the DU part of the relay node" provided in the above step 2-1 can be referred to;

Step 2D-2: The base station 2 may transmit a context response message to the base station 1. The message may include the DU context (UE) of the relay node.

Further, before step 2D-1, step 2D-0 may be further included, in which the UE served by the relay node may transmit a request message to the base station 1, and for information contained in the message, the above step 2-0 can be referred to.

According to the above-mentioned exemplary embodiment of the present disclosure for the second aspect, the context related to the relay node can be acquired between the base stations, which is beneficial for maintaining the connection between the mobile terminal of the relay node and the network side, the connection between the distribution unit of the relay node and the anchor node, and the connection between the UE served by the relay node and the network side.

Third Aspect: Interface Management Between the DU of the Relay Node and the Anchor Node (or the CU of the Anchor Node)

This process may be mainly applied to the interface management between the distributed unit of the relay node and the anchor node (or the CU of the anchor node) after the relay node reestablishes a connection with the anchor node (the old anchor node or a new anchor node). One embodiment may be the management of F1 interface.

[1] Interface Management Initiated by the First Node

Here, the first node may be a relay node or a DU of the relay node, and a second node to be mentioned below may be an anchor node or a CU of the anchor node.

Hereinafter, a method performed at a first node for managing an interface according to an exemplary embodiment of the present disclosure will be described in detail with reference to FIG. 12.

Figure 12:
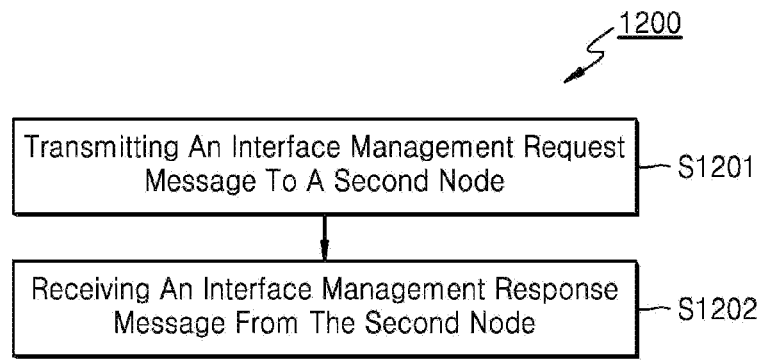
FIG. 12 schematically illustrates a flowchart of a method performed at a first node for managing an interface according to an exemplary embodiment of the present disclosure.

FIG. 12 schematically illustrates a flowchart of a method 1200 performed at a first node for managing an interface according to an exemplary embodiment of the present disclosure.

As shown in FIG. 12, the method 1200 may include steps S1201 to S1202.

In step S1201, the first node may transmit an interface management request message to the second node.

The interface management request message may include at least one of: information of a non-UE, related DU context (DU Context (non-UE)) which is stored by the first node and used before the first node reestablishes a connection or when a connection failure occurs, information of a non-UE related DU context (DU Context (non-UE)) used by the first node when the first node transmits the interface management request message, information related to the MT part of the first node, or information related to a UE served by the first node.

Specifically, the information of a non-UE related DU context which is stored by the first node and used before a connection is reestablished or when a connection failure occurs may include at least one of: information related to a cell served by the DU part of the first node before the first node reestablishes the connection or when a connection failure occurs, or information related to activated or deactivated cells before the first node reestablishes the connection or when a connection failure occurs.

Specifically, the information in a non-UE related DU context used by the first node when transmitting the interface management request message may include at least one of: information related to the cell served by the DU part of the first node when the first node transmits the interface management request message, or information related to a cell suggested to be activated or inactivated when the first node transmits the interface management request message, The information related to the MT part of the first node may include at least one of: identification information of the MT part of the relay node, identification information of a cell accessed by the MT part of the relay node, or shortMAC-I used by the MT part of the relay node, In step S1202, the first node may receive an interface management response message from the second node, wherein the interface management response message may include at least one of: identification information/name information of the second node, radio resources control (RRC) version information of the second node, information related to a UE served by the first node, information related to cells that need to be activated or deactivated, address related information, or indication information for indicating the reuse of the non-UE related context which is stored at the first node side and used before a connection is reestablished or when a connection failure occurs.

Specifically, the information related to cells that need to be activated or deactivated may include at least one of: identification information of the cell, or system information of the second node side.

Specifically, the address related information may include at least one of: TNLA related information of the second node side, or TNLA related information of the first node side.

Figure 13:
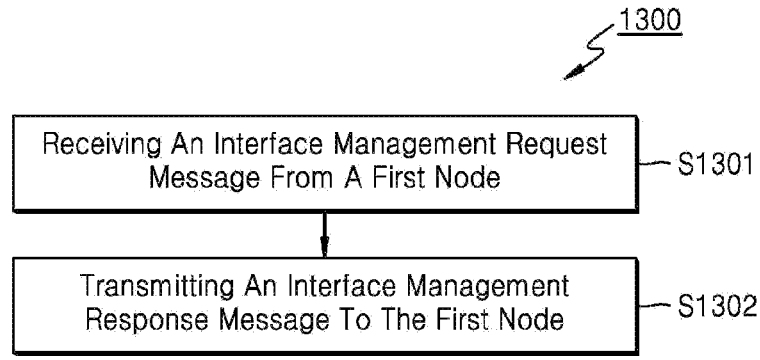
FIG. 13 schematically illustrates a flowchart of a method performed at a second node for managing an interface according to an exemplary embodiment of the present disclosure.

Accordingly, FIG. 13 schematically illustrates a flowchart of a method 1300 performed at a second node for managing an interface according to an exemplary embodiment of the present disclosure.

As shown in FIG. 13, the method 1300 may include steps S1301 to S1302.

In step S1301, the second node may receive the above-mentioned interface management request message from the first node.

In step S1302, the second node may transmit the above-mentioned interface management response message to the first node.

A signaling flow for managing an interface according to an exemplary embodiment of the present disclosure may be described below with reference to FIG. 14, in which a relay node may be used as an example of the first node, and the relay node may perform the method 1200 described with reference to FIG. 12, while an anchor node may be used as an example of the second node, and the anchor node may perform the method 1300 described with reference to FIG. 13, see the foregoing description for FIGS. 12 and 13 for details.

Figure 14:
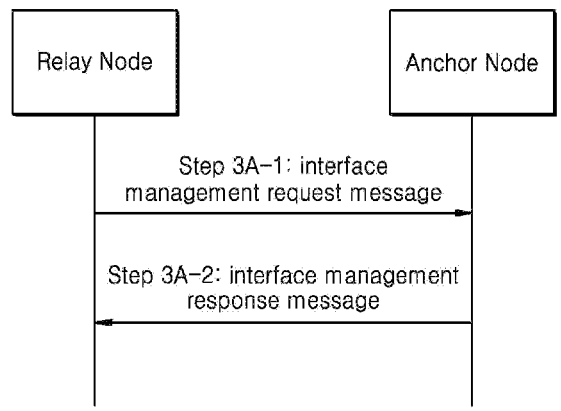
FIG. 14 schematically illustrates a signaling flowchart for managing an interface according to an exemplary embodiment of the present disclosure.

As shown in FIG. 14, the signaling flow may include the following steps:

Step 3A-1: The relay node may transmit an interface management request message to the anchor node A (or the CU of the anchor node). The message may be mainly used to provide information related to the DU part of the relay node. The message may further include at least one of:

(1) information in the DU context (non-UE) defined above (for the content of this information, see the DU context (non-UE) in the above DU context), which is stored by the first node and used before a connection is reestablished or when a connection failure occurs, wherein the context can be considered to be the old non-UE related context, and also includes at least one of information:
1) information related to the cell served by the DU part of the relay node, such as the cell identity (old cell identity). For each serving cell, the information may also include: new identification information of the cell, such as New NR CGI, New PCI, etc. In one embodiment, the identification information may be identification information used by the serving cell when the relay node transmits the interface management request message, and may further include indication information for indicating whether the cell is activated.
2) information of an activated (or deactivated) cell, such as identification information of the cell, wherein the information may include information of at least one cell. In one embodiment, the cell identifier may be a cell identifier selected from the identifiers of cells served by the DU part of the relay node and included in the old context; while in another embodiment, the cell identifier may be a cell identifier selected from new identifiers corresponding to cells served by the DU part of the relay node and included in the old context (2) information in the above newly defined DU context (non-UE) used by the relay node when transmitting the interface management request message (for the content of this information, see the DU context (non-UE) in the DU context), wherein this context can be considered to be a new non-UE related context, and may further contain at least one of information:
1) information related to the cell served by the DU part of the relay node, such as the cell identity (new cell identity). For each serving cell, the information may also include: old identification information of the cell, such as old NR CGI, old PCI, etc. In one embodiment, the identification information may be identification information used by the serving cell before the relay node reestablishes a connection or when a connection failure occurs, and may further include indication information for indicating whether the cell is activated.
2) information of a cell suggested to be activated (or deactivated), such as identification information of the cell, wherein the information may include information of at least one cell. In one embodiment, the cell identifier may be a cell identifier selected from the identifiers of cells served by the DU part of the relay node and included in the new context; while in another embodiment, the cell identifier may be a cell identifier selected from old identifiers corresponding to cells served by the DU part of the relay node and included in the new context (3) information related to the MT part of the relay node, which includes at least one of:
1) identification information of the MT part of the relay node, such as C-RNTI, wherein the identification information may be identification information used by the MT part of the relay node before the connection reestablishment is initiated (or when a connection failure occurs). In an embodiment, for the mobility failure or the reconfiguration with sync failure, the C-RNTI is the C-RNTI of the MT in the source PCell. In another embodiment, for other MT failures, the C-RNTI may be the C-RNTI in the primary cell (PCell) where the MT is located when an event triggering the reestablishment occurs
2) identification information of the cell accessed by the MT part of the relay node, such as PCI and NR CGI, wherein the identification information may be identification information of the cell accessed by the MT part of the relay node before the connection reestablishment is initiated (or when a connection failure occurs). In an embodiment, for the mobility failure or the reconfiguration with sync failure, the cell identifier may be the identifier of the source PCell where the MT is located. In another embodiment, for other MT failures, the cell identifier may be the identifier of the primary cell (PCell) where the MT is located when an event triggering the reestablishment occurs
3) For the shortMAC-I used by the MT part of the relay node, see information contained in RRCReestablishmentRequest in TS38.331.

(4) information related to the UE served by the relay node. For each UE, this information can refer to the information in the DU context (UE) in the above defined DU context, such as the identification information of the UE (e.g. C-RNTI, identification information of the UE on the F1 interface (e.g. gNB-CU UE F1AP ID, and/or gNB-DU UE F1AP ID), identification information of the UE at the relay node (e.g. IAB node UE ID), identification information of the UE at the anchor node (e.g. IAB donor UE ID), etc.), the identification information may be identification information used by the UE before the relay node reestablishes a connection or when a link failure occurs, and further, it may include new identification information of the UE that is generated by the relay node when transmitting the interface management request message, such as new gNB-DU UE F1AP ID.

In an implementation of step 3A-1, the relay node may keep some or all of the information (such as identification information) of the served cell the same as that of the cell served before the connection is reestablished or when a connection failure occurs (for example, if the identity of a cell served by the relay node when the relay node accesses the old anchor node is 1, the identity of the cell the relay node serves may be still 1 after the relay node accesses a new anchor node. In this embodiment, the base station identification information contained in the identification information of the cell served by the distributed unit may be different from the identification information of the base station to which the new anchor node belongs. Further, the new anchor node may also transmit a configuration update message to other base stations. The message may include the identifier of the serving cell of the distributed unit, wherein the base station identification information contained in the identifier and the identification information of the base station to which the new anchor node belongs are different.

In another implementation of step 3A-1, the relay node may update some or all of the information (such as identification information) of the cell served before the connection is reestablished or when a connection failure occurs (for example, if the identity of a cell served by the relay node when the relay node accesses the old anchor node is 1, the identity of the cell the relay node serves may be changed to 2 after the relay node accesses a new anchor node. This may be because a change of the anchor node means the change of the base station. The interface management request message may include a new non-UE related context (that is, a non-UE related context used by the relay node when the relay node initiates the request message), and for each serving cell, it may also provide identification information (such as old NR CGI, old PCI) used by the cell before the connection is reestablished or when a connection failure occurs.

In another implementation of step 3A-1, the relay node may update some or all of the information (such as identification information) of the cell served before the connection is reestablished or when a connection failure occurs (for example, if the identity of a cell served by the relay node when the relay node accesses the old anchor node is 1, the identity of the cell the relay node serves may be changed to 2 after the relay node accesses a new anchor node. This may be because a change of the anchor node means the change of the base station. The interface management request message may include the old non-UE related context (that is, the non-UE related context stored by the relay node and used before the connection is reestablished or when a connection failure occurs), and information in this context that needs to be updated may be updated. For each serving cell, it may also provide identification information (such as new NR CGI, new PCI) used by the cell when the relay node initiates the request message.

In another implementation of step 3A-1, the relay node may provide the anchor node with information that can help the anchor node acquire or find the context of the relay node. This information may be information used by the relay node before a connection is reestablished or when a connection failure occurs, and may include at least one of: identification information (such as old gNB-DU ID/Name, old IAB node DU ID/Name) used by the DU part of the relay node, identification information (such as old IAB node ID/Name) of the relay node, identification information (such as gNB/gNB-CU/IAB Donor/IAB donor-CU ID/Name) of the anchor node to which the relay node is connected, the C-RNTI of the mobile terminal part of the relay node, the PCI of the cell in which it is located, the ShortMAC-I (such as information contained in the RRCReestablishmentRequest message) of the mobile terminal, and the identifier (such as the NR CGI) of the cell served by the relay node. In this implementation, the relay node may also provide, in this step, the above-mentioned identification information (identification information of the DU part of the relay node, identification information of the relay node) currently used by the relay node.

Step 3A-2: The anchor node (or the CU of the anchor node) may transmit an interface management response message to the relay node, and the message may include at least one of:
  (1) identification information/name information of the anchor node, such as gNB-CU ID/Name, gNB ID/Name, IAB donor ID/Name, IAB donor CU ID/Name (2) RRC version information of anchor nodes (3) information related to the served UE. For each UE, this information may include the identification information of the UE (e.g. C-RNTI, identification information of the UE on the F1 interface (e.g. gNB-CU UE F1AP ID, and/or gNB-DU UE F1AP ID), identification information of the UE at the relay node (e.g. IAB node UE ID), identification information of the UE at the anchor node (e.g. IAB donor UE ID), etc.). This information may be identification information used before the relay node reestablishes a connection or when a link failure occurs, and further, it may include new identification information of the UE that is generated by the anchor node when the interface management request message is received, such as new gNB-CU UE F1AP ID. (4) information related to the cell that needs to be activated (or deactivated), which may include at least one of:
  1) identification information of a cell, this information may include information of at least one cell. In one embodiment, the identification information may be identification information of a serving cell included in the old context in step 3A-1. In another embodiment, the identification information may be identification information of a serving cell included in the new context in step 3A-1.
  2) system information of the anchor node side, such as SIB2, SIB3, . . . , SIB9, etc. (5) address related information (TNLA-related information), see "address related information" defined in the DU context (non-UE) of the above DU context, wherein this information may include at least one of:
    a) anchor node side transmission network layer association (TNLA) related information. For a TNLA, in one embodiment, this information may be information related to the new anchor node side TNLA, generated by the anchor node when it receives the interface management request message in step 3A-1. In another embodiment, the information may be information related to the old anchor node side TNLA used by the anchor node connected to the relay node before the relay node reestablishes a connection or when a connection failure occurs. In a further embodiment, the information may include: at least one of information related to the new anchor node side TNLA generated by the anchor node when it receives the interface management request message in step 3A-1, and/or information related to the old anchor node side TNLA used by the anchor node connected to the relay node before the relay node reestablishes a connection or when a connection failure occurs b) relay node side TNLA related information. For a TNLA, in one embodiment, this information may be information related to the new relay node side TNLA used by the relay node when the anchor node receives the interface management request message in step 3A-1. In another embodiment, the information may be information related to the old relay node side TNLA used by the relay node before the relay node reestablishes a connection or when a connection failure occurs. In a further embodiment, the information may include: information related to the new relay node side TNLA used by the relay node when the anchor node receives the interface management request message in step 3A-1, and information related to the old relay node side TNLA used by the relay node before the relay node reestablishes a connection or when a connection failure occurs (6) indication information for indicating the reuse of the old non-UE related context which is stored at the relay node side.

The interface management request message and interface management response message involved in the above process may, respectively, be the F1 setup Request and F1 Setup Response messages defined in TS38.473, or the gNB-DU configuration update and gNB-DU configuration update acknowledge messages, or newly defined messages, such as Context provision and Context provision acknowledge messages.

The above process may be applied to the management of the interface (such as the establishment of the interface or the update of the interface configuration) between the DU part of the relay node and the anchor node (or the CU of the anchor node), or to the existing management of the interface (such as the establishment of the interface or the update of the interface configuration) between the central unit and the distributed unit of the base station.

Figure 15:
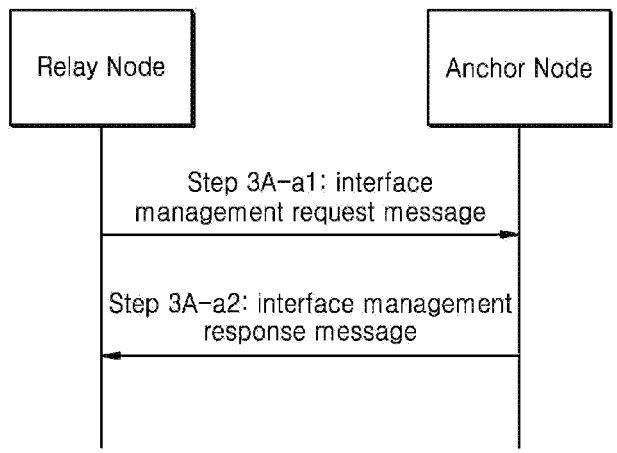
FIGS. 15 to 17 schematically illustrate a signaling flowchart for managing an interface according to the first to third exemplary embodiments of the present disclosure.
Figure 16:
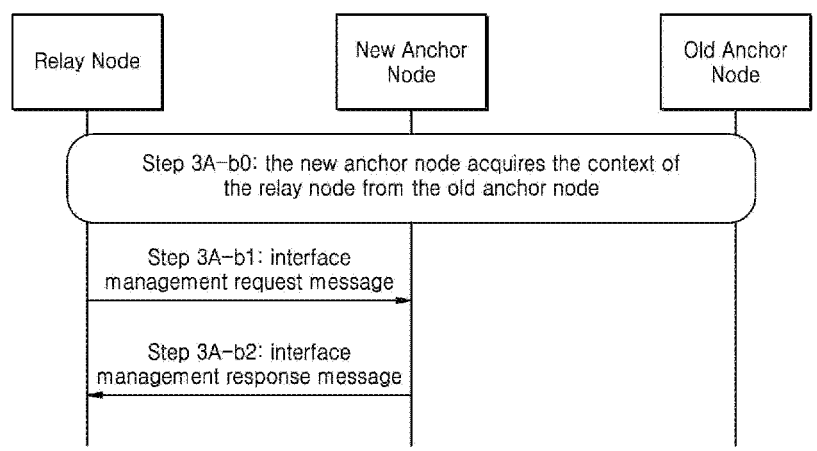
Figure 17:
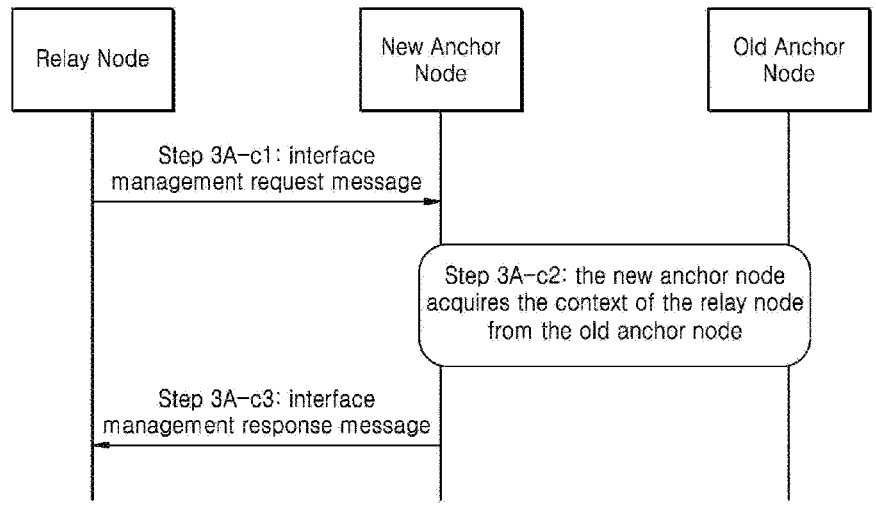

Further, when the above process is used to acquire a DU context, the following implementations may also be performed, as shown in FIGS. 15 to 17.

FIG. 15 schematically illustrates a signaling flow for managing an interface according to the first exemplary embodiment of the present disclosure.

In this exemplary implementation, the relay node may provide a DU context to the anchor node, as shown in FIG. 15. In this exemplary implementation, the DU context may be provided by the relay node, and the new anchor node may not need to acquire the DU context from the old anchor node. The flow may include the following steps:

Step 3A-a1: the relay node may transmit an interface management request message to the new anchor node, and for the information contained in the message, see the above step 3A-1 for details.

Step 3A-a2: the new anchor node may transmit an interface management response message to the relay node, and for the information contained in the message, see the above step 3A-2 for details.

FIG. 16 schematically illustrates a signaling flow for managing an interface according to the second exemplary embodiment of the present disclosure.

In this exemplary implementation, the anchor node may acquire the DU context of the relay node before the relay node initiates a connection with the anchor node, as shown in FIG. 16. The flow may include the following steps:

Step 3A-b0: the new anchor node may acquire the context of the relay node from the old anchor node, see the content of the second aspect of the present disclosure Step 3A-b1: the relay node may transmit an interface management request message to the new anchor node, and for the information contained in the message, see the above step 3A-1 for details.

Step 3A-b2: the new anchor node may transmit an interface management response message to the relay node, and for the information contained in the message, see the above step 3A-2 for details.

FIG. 17 schematically illustrates a signaling flow for managing an interface according to the third exemplary embodiment of the present disclosure.

In this exemplary implementation, the anchor node may acquire the DU context of the relay node after the relay node initiates a connection with the anchor node, as shown in FIG. 17. The flow may include the following steps:

Step 3A-c1: the relay node may transmit an interface management request message to the new anchor node, and for the information contained in the message, see the above step 3A-1 for details.

Step 3A-c2: the new anchor node may acquire the context of the relay node from the old anchor node according to the information acquired in step 3A-c1, see steps 2-1 and 2-2 of the second aspect of the present disclosure.

Step 3A-c3: the new anchor node may transmit an interface management response message to the relay node, and for the information contained in the message, see the above step 3A-2 for details.

[2] Interface Management Initiated by the Second Node

This process may be a process for updating the interface configuration initiated by the second node, and may be mainly used to update the configuration of the interface between the second node and the first node. Here, the first node may be a relay node or a DU of the relay node, and the second node may be an anchor node or a CU of the anchor node.

Hereinafter, a method performed at a first node for updating an interface configuration according to an exemplary embodiment of the present disclosure will be described in detail with reference to FIG. 18.

Figure 18:
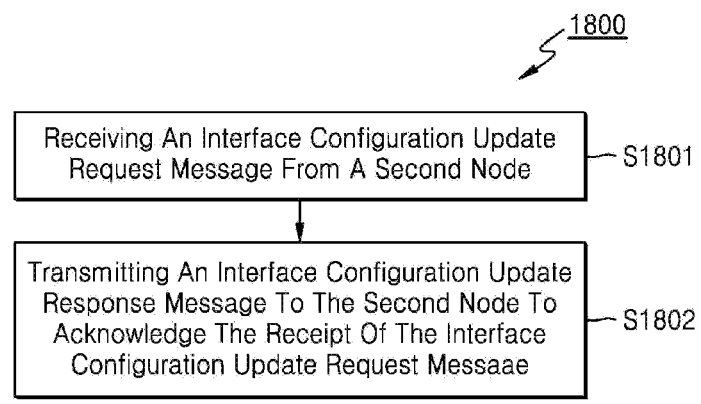
FIG. 18 schematically illustrates a flowchart of a method performed at a first node for updating an interface configuration according to an exemplary embodiment of the present disclosure.

FIG. 18 schematically illustrates a flowchart of a method 1800 performed at a first node for updating an interface configuration according to an exemplary embodiment of the present disclosure.

As shown in FIG. 18, the method 1800 may include steps S1801 to S1802.

In step S1801, the first node may receive an interface configuration update request message from a second node to update a configuration of the interface between the first node and the second node.

The interface configuration update request message may include at least one of: identification information/name information of the second node, RRC version information of the second node, information related to a UE served by the first node, information related to a cell that needs to be activated or deactivated, or address related information.

In step S1802, the first node may transmit an interface configuration update response message to the second node to acknowledge the receipt of the interface configuration update request message.

Figure 19:
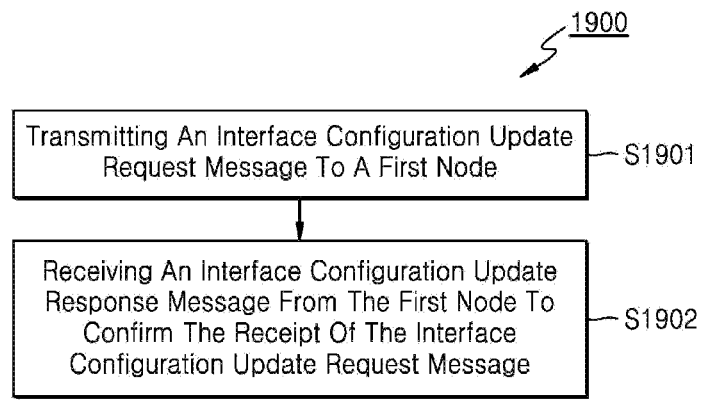
FIG. 19 schematically illustrates a flowchart of a method performed at a second node for updating an interface configuration according to an exemplary embodiment of the present disclosure.

Accordingly, FIG. 19 schematically illustrates a flowchart of a method 1900 performed at a second node for updating an interface configuration according to an exemplary embodiment of the present disclosure.

As shown in FIG. 19, the method 1900 may include steps S1901 to S1902.

In step S1901, the second node may transmit the above mentioned interface configuration update request message to the first node for updating a configuration of the interface between the first node and the second node.

In step S1902, the second node may receive the above mentioned interface configuration update response message from the first node to confirm the receipt of the interface configuration update request message by the first node.

A signaling flow for updating an interface configuration according to an exemplary embodiment of the present disclosure may be described below with reference to FIG. 20, in which a relay node is used as an example of the first node, and the relay node may perform the method 1800 described with reference to FIG. 18, while an anchor node may be used as an example of the second node, and the anchor node may perform the method 1900 described with reference to FIG. 19, see the foregoing description for FIGS. 18 and 19 for details.

Figure 20:
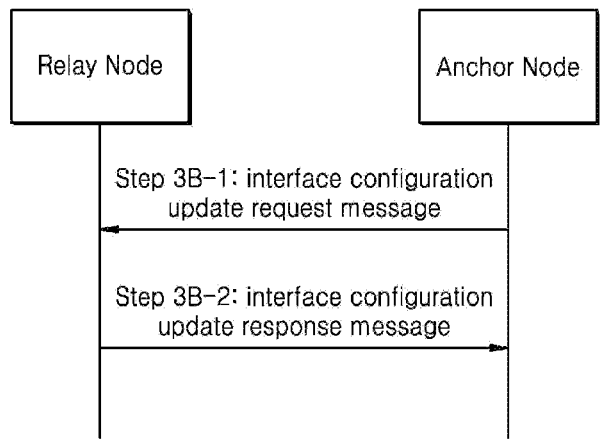
FIG. 20 schematically illustrates a signaling flowchart for updating an interface configuration according to an exemplary embodiment of the present disclosure.

As shown in FIG. 20, the signaling flow may include the following steps:

Step 3B-1: the anchor node may transmit an interface configuration update request message to the relay node, and the message may include at least one of:
- (1) address related information (or TNLA-related information), see "address related information" defined in the DU context (non-UE) of the above DU context, wherein this information includes at least one of:
  anchor node side TNLA related information. For a TNLA, in one embodiment, this information may be information related to the new anchor node side TNLA, generated by the anchor node. In another embodiment, the information may be information related to the old anchor node side TNLA used by the anchor node connected to the relay node before the relay node reestablishes a connection or when a connection failure occurs. In a further embodiment, the information may include: at least one of information related to the new anchor node side TNLA generated by the anchor node, and/or information related to the old anchor node side TNLA used by the anchor node connected to the relay node before the relay node reestablishes a connection or when a connection failure occurs
  relay node side TNLA related information. For a TNLA, in one embodiment, this information may be information related to the new relay node side TNLA used by the relay node. In another embodiment, the information may be information related to the old relay node side TNLA used by the relay node before the relay node reestablishes a connection or when a connection failure occurs. In a further embodiment, the information may include at least one of information related to the new relay node side TNLA used by the relay node, and/or information related to the old relay node side TNLA used by the relay node before the relay node reestablishes a connection or when a connection failure occurs
- (2) other information defined in the above step 3A-2.

Step 3B-2: the relay node may transmit an interface configuration update response message to the anchor node. This message may be an acknowledgement of the information received in step 3B-1. For details, see the gNB-CU configuration update acknowledge message in TS38.473.

The above process may reuse the configuration update process initiated by gNB-CU defined in TS38.473, or it can be a newly defined process.

Optionally, before step 3B-1, a process for the anchor node to acquire the context related to the relay node from other nodes may also be included. In one embodiment, for the process for the anchor node to acquire the context from the relay node, see the interface management initiated by the relay node as mentioned above. In another embodiment, for the process for the anchor node to acquire the context from other anchor nodes, see steps 2-1 and 2-2 of the second aspect of the present disclosure.

According to the above-mentioned exemplary embodiment of the present disclosure for the third aspect, after the relay node reestablishes the connection to the new anchor node, the relay node may establish a connection with the anchor node, such as an F1 interface, which can further help the relay node to perform signaling interaction with the anchor node and serve the UE accessing the relay node.

Fourth Aspect: UE Context Management Between the Relay Node and the Anchor Node (or the CU of the Anchor Node)

This process may mainly involve information interaction between the relay node and the anchor node to implement management of the context of the UE accessing the relay node. The specific process may be:

[1] Context Management Process for UE Accessing the First Node

Here, the first node may be a relay node or a DU of the relay node, and a second node to be mentioned below may be an anchor node or a CU of the anchor node.

Hereinafter, a method performed at a first node for managing a UE context according to an exemplary embodiment of the present disclosure will be described in detail with reference to FIG. 21.

Figure 21:
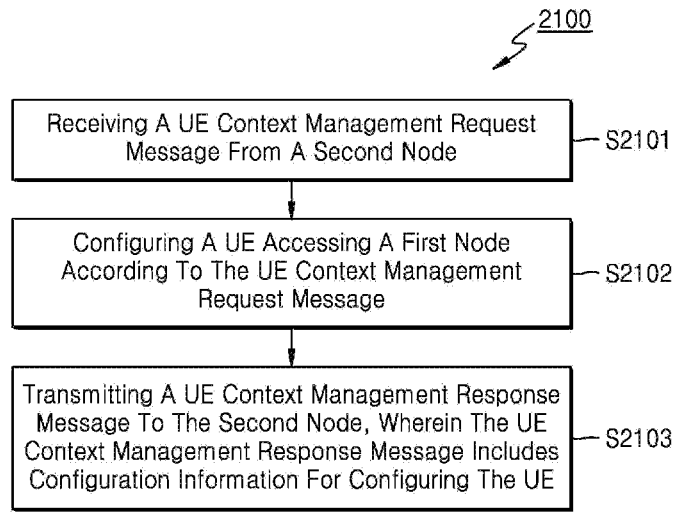
FIG. 21 schematically illustrates a flowchart of a method performed at a first node for managing a UE context according to an exemplary embodiment of the present disclosure.

FIG. 21 schematically illustrates a flowchart of a method 2100 performed at a first node for managing a UE context according to an exemplary embodiment of the present disclosure.

As shown in FIG. 21, the method 2100 may include steps S2101 to S2103.

In step S2101, the first node may receive the above-mentioned UE context management request message from the second node.

The UE context management request message may include at least one of identification information of a UE accessing the first node, identification information of the first node, or information of a serving cell of the UE accessing the first node.

Specifically, the identification information of the UE accessing the first node may include at least one of identification information of the UE after the first node reestablishes a connection, or identification information of the UE before the first node reestablishes a connection or when a connection failure occurs, Specifically, the identification information of the first node includes at least one of identification information/name information of a distributed unit, DU, of the first node before the first node reestablishes a connection or when a connection failure occurs, identification information/name information of the first node before the first node reestablishes a connection or when a connection failure occurs, or identification information/name information of the second node to which the first node was connected before the first node reestablishes a connection or when a connection failure occurs, Specifically, the information of the serving cell of the UE accessing the first node includes at least one of identification information of one or more cells serving the UE before the first node reestablishes a connection or when a connection failure occurs, identification information of one or more cells serving the UE after the first node reestablishes a connection, indication information for indicating releasing a cell serving the UE before the first node reestablishes a connection or when a connection failure occurs, or indication information for indicating reconfiguring a serving cell of the UE.

In step S2102, the first node may configure the UE accessing the first node according to the UE context management request message.

In step S2103, the first node may transmit a UE context management response message to the second node, wherein the UE context management response message may include configuration information indicating that the UE is configured.

Figure 22:
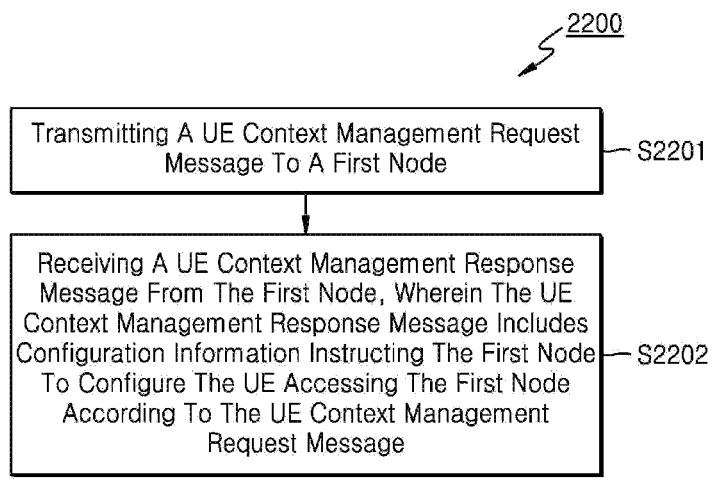
FIG. 22 schematically illustrates a flowchart of a method performed at a second node for managing a UE context according to an exemplary embodiment of the present disclosure.

Accordingly, FIG. 22 schematically illustrates a flowchart of a method 2200 performed at a second node for managing a UE context according to an exemplary embodiment of the present disclosure.

As shown in FIG. 22, the method 2200 may include steps S2201 to S2202.

In step S2201, the second node may transmit the above-mentioned UE context management request message to the first node.

In step S2202, the second node may receive a UE context management response message from the first node, wherein the UE context management response message may include configuration information instructing the first node to configure the UE accessing the first node according to the UE context management request message.

A signaling flow for managing a UE context according to an exemplary embodiment of the present disclosure may be described below with reference to FIG. 23, in which a relay node is used as an example of the first node, and the relay node may perform the method 2100 described with reference to FIG. 21, while an anchor node is used as an example of the second node, and the anchor node may perform the method 2200 described with reference to FIG. 22, see the foregoing description for FIGS. 21 and 22 for details.

Figure 23:
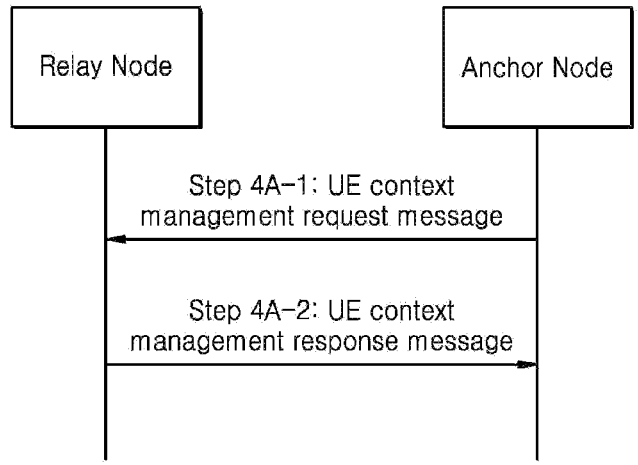
FIG. 23 schematically illustrates a signaling flowchart for managing a UE context according to an exemplary embodiment of the present disclosure.

As shown in FIG. 23, the signaling flow may include the following steps:

Step 4A-1: The anchor node may transmit a UE context management request message to the relay node. For a UE, the message may include at least one of:

identification information of the UE, which may include at least one of:
1. identification information of the UE after the relay node reestablishes the connection, such as C-RNTI, identification information of the UE on the F1 interface (such as gNB-CU UE F1AP ID, and/or gNB-DU UE F1AP ID), identification information of the UE at the relay node (such as IAB node UE ID), identification information of the UE at the anchor node (such as IAB donor UE ID), etc. This message may contain one or more of the above identification information. The identification information may be considered as the new identification information of the UE.
2. identification information of the UE before the relay node reestablishes a connection or when a connection failure occurs, such as C-RNTI, identification information of the UE on the F1 interface (such as gNB-CU UE F1AP ID, and/or gNB-DU UE F1AP ID), identification information of the UE at the relay node (such as IAB node UE ID), identification information of the UE at the anchor node (such as IAB donor UE ID), etc. This message may contain one or more of the above identification information. The identification information may be considered as the old identification information of the UE.

identification information of the relay node, which may include at least one of:
1. identification information/name information of the distributed unit of the relay node before the relay node reestablishes the connection or when a connection failure occurs, such as gNB-DU ID/Name and IAB node DU ID/Name
2. identification information/name information of the relay node before the relay node reestablishes the connection or when a connection failure occurs, such as IAB node ID/Name
3. identification information/name information of an anchor node connected to the relay node before the relay node reestablishes the connection or when a connection failure occurs, such as gNB/gNB-CU/IAB Donor/IAB donor-CU ID/Name identification information of the serving cell of the UE, which may include at least one of:
1. identification information of one or more cells serving the UE before the relay node reestablishes the connection or when a connection failure occurs, such as NR CGI and NR PCI, the cell may be the PCell, PSCell, or SCell of the UE
2. identification information of one or more cells serving the UE after the relay node reestablishes the connection, such as NR CGI and NR PCI, the cell may be the PCell, PSCell, or SCell of the UE
3. indication information for indicating to release the cell serving the UE before the relay node reestablishes the connection or when a connection failure occurs
4. indication information for indicating the reconfiguration of the serving cell of the UE. In an embodiment, if the identification information of the cell serving the UE changes before or after reestablishing the connection, this indication information is used to instruct the relay node to reconfigure the identifier of the cell serving the UE to a corresponding cell identifier after the relay node reestablishes the connection The UE context management request message may be a DL RRC Message Transfer message defined in TS38.473, so that there may be no need for feedback from the relay node. The relay node may directly acquire the context stored in the message by the UE based on the content of the message, and the relay node may be configured to serve the UE.

Further, optionally, a step 4A-2 may be also included: the relay node may transmit a UE context management response message to the anchor node, and the message may be to reconfigure the UE according to the information content received in step 4A-1, and to transmit the generated configuration information to the anchor node. For information contained in this message, see the UE Context Setup/Modification Request message in TS38.473. In this way, this process may reuse the UE context setup/modification process in TS38.473, or this process may be a new process.

Further, optionally, after step 4A-2, step 4A-3 may be further included to configure the UE. This step may be to transmit part of the information received in step 4A-1 (such as the RRC message for configuring the UE) to the UE, or may be that the anchor node transmits the generated information for configuring the UE to the UE via the relay node.

[2] Acquire the UE Context of the First Node

This process may be a process in which the second node acquires the UE context from the first node. Here, the first node may be a relay node or a DU of the relay node, and the second node may be an anchor node or a CU of the anchor node.

Hereinafter, a method performed at a first node for acquiring a UE context according to an exemplary embodiment of the present disclosure will be described in detail with reference to FIG. 24.

Figure 24:
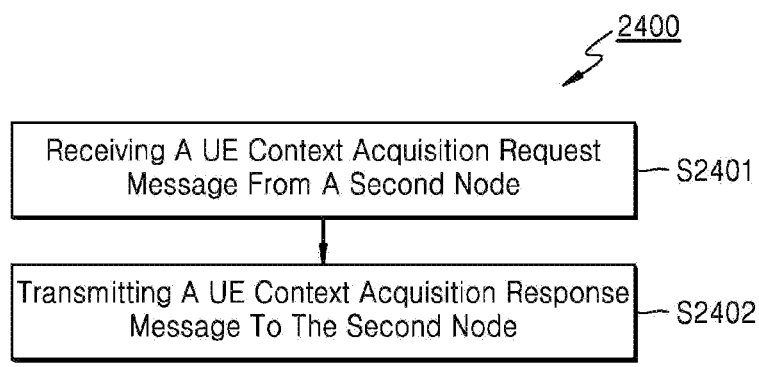
FIG. 24 schematically illustrates a flowchart of a method performed at a first node for acquiring a UE context according to an exemplary embodiment of the present disclosure.

FIG. 24 schematically illustrates a flowchart of a method 2400 performed at a first node for acquiring a UE context according to an exemplary embodiment of the present disclosure.

As shown in FIG. 24, the method 2400 may include steps S2401 to S2402.

In step S2401, the first node may receive the UE context acquisition request message from the second node.

The UE context acquisition request message may include at least one of identification information of the UE accessing the first node, information of the serving cell of the UE accessing the first node, or shortMAC-I used by the UE accessing the first node before the first node reestablishes the connection or when a connection failure occurs.

Specifically, the identification information of the UE accessing the first node may include at least one of identification information of the UE after the first node reestablishes the connection, or identification information of the UE before the first node reestablishes the connection or when a connection failure occurs, Specifically, the information of the serving cell of the UE accessing the first node includes at least one of identification information of one or more cells serving the UE before the first node reestablishes the connection or when a connection failure occurs, or identification information of one or more cells serving the UE after the first node reestablishes the connection.

In step S2402, the first node may transmit the UE context acquisition response message to the second node.

The UE context acquisition response message may include at least one of a context of a UE for which the first node successfully obtained a context, or identification information of a UE for which the first node did not obtain a context successfully.

Figure 25:
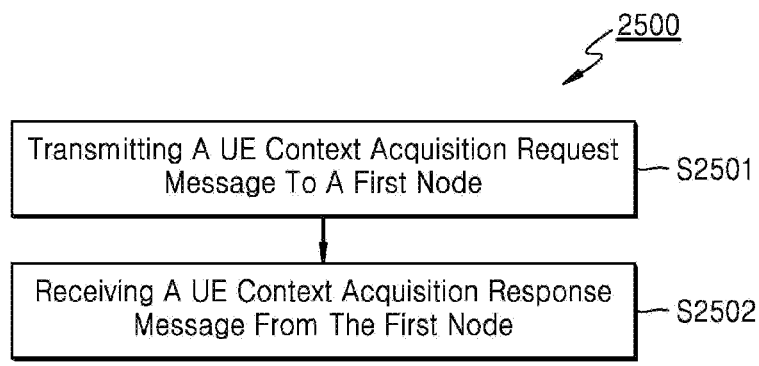
FIG. 25 schematically illustrates a flowchart of a method performed at a second node for acquiring a UE context according to an exemplary embodiment of the present disclosure.

Accordingly, FIG. 25 schematically illustrates a flowchart of a method 2500 performed at a second node for acquiring a UE context according to an exemplary embodiment of the present disclosure.

As shown in FIG. 25, the method 2500 may include steps S2501 to S2502.

In step S2501, the second node may transmit the above-mentioned UE context acquisition request message to the first node.

In step S2502, the second node may receive the above-mentioned UE context acquisition response message from the first node.

A signaling flow for acquiring a UE context according to an exemplary embodiment of the present disclosure may be described below with reference to FIG. 26, in which a relay node is used as an example of the first node, and the relay node may perform the method 2400 described with reference to FIG. 24, while an anchor node is used as an example of the second node, and the anchor node may perform the method 2500 described with reference to FIG. 25, see the foregoing description for FIGS. 24 and 25 for details.

Figure 26:
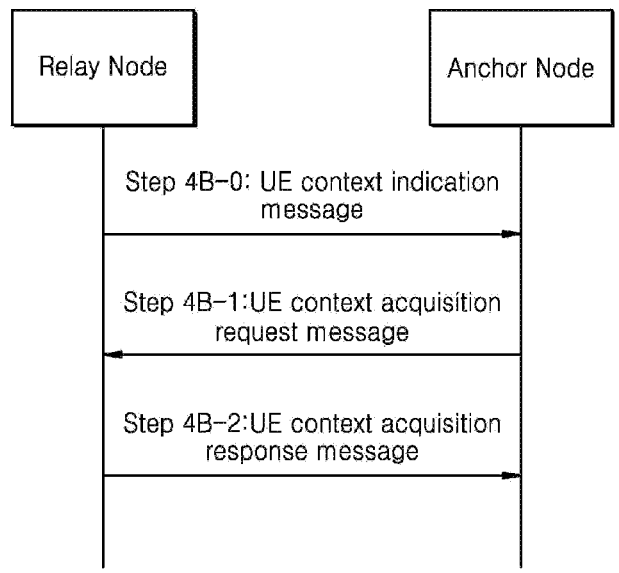
FIG. 26 schematically illustrates a signaling flowchart for acquiring a UE context according to an exemplary embodiment of the present disclosure.

As shown in FIG. 26, the signaling flow may include the following steps:

Step 4B-1: the anchor node may transmit a UE context acquisition request message to the relay node. For a UE, the message includes at least one of:
  identification information of the UE, which includes at least one of:
  1. identification information of the UE after the relay node reestablishes the connection, such as C-RNTI, identification information of the UE on the F1 interface (such as gNB-CU UE F1AP ID, and/or gNB-DU UE F1AP ID), identification information of the UE at the relay node (such as IAB node UE ID), identification information of the UE at the anchor node (such as IAB donor UE ID), etc. This message may contain one or more of the above identification information. The identification information may be considered as the new identification information of the UE.
  2. identification information of the UE before the relay node reestablishes a connection or when a connection failure occurs, such as C-RNTI, identification information of the UE on the F1 interface (such as gNB-CU UE F1AP ID, and/or gNB-DU UE F1AP ID), identification information of the UE at the relay node (such as IAB node UE ID), identification information of the UE at the anchor node (such as IAB donor UE ID), etc. This message may contain one or more of the above identification information. The identification information may be considered as the old identification information of the UE.
  identification information of the serving cell of the UE, which includes at least one of:
  1. identification information of one or more cells serving the UE before the relay node reestablishes the connection or when a connection failure occurs, such as NR CGI and NR PCI, the cell may be the PCell, PSCell, or SCell of the UE
  2. identification information of one or more cells serving the UE after the relay node reestablishes the connection, such as NR CGI and NR PCI, the cell may be the PCell, PSCell, or SCell of the UE
  shortMAC-I used by the UE before the relay node reestablishes the connection (or when a connection failure occurs), see information contained in RRCReestablishmentRequest in TS38.331 for details.

Step 4B-2: The relay node may acquire the context of the UE according to the message transmitted in step 4B-1, and transmit the context of the UE to the anchor node through the UE context acquisition response message. The message may include at least one of:
  1) For a UE that successfully acquires the context, the information includes the context of the UE. The context may be the context of the UE stored at the relay node before the relay node reestablishes the connection or when a connection failure occurs. For information of the context, see the above UE context. In one embodiment, the information may include information related to one or more DRB/SRBs established by the UE, information related to a QoS flow included in each DRB, information related to one or more cells serving the UE, etc.
  2) For a UE that does not successfully acquire the context, the information includes the identification information of the UE After the above two steps, the anchor node can acquire the context of the UE from the relay node.

Optionally, before step 4B-1, the method may further include:

Step 4B-0: the relay node may transmit a UE context indication message to the anchor node, the indication message indicating that the relay node contains the context of the UE it serves; and further, for a UE corresponding to the UE context contained in the relay node, the message may include identification information of the UE. The identification information may be identification information used by the UE before the relay node reestablishes a connection or when a connection failure occurs, and the information may include, for example, C-RNTI, identification information of the UE on the F1 interface (such as gNB-CU UE F1AP ID, and/or gNB-DU UE F1AP ID), identification information of the UE at the relay node (such as IAB node UE ID), identification information of the UE at the anchor node (such as IAB donor UE ID), etc. This message may contain one or more of the above identification information. After receiving the indication message, the anchor node may decide whether to request the context of the UE from the relay node, and the UEs for which the contexts are acquired from the relay node.

In addition, step 4B-0 may be performed independently, that is, there may be no steps 4B-1 and 4B-2 after step 4B-0.

According to the above-mentioned exemplary embodiments of the present disclosure for the fourth aspect, the context of the UE before the relay node reestablishes the connection or when a connection failure occurs can be acquired, which may help the anchor node configure the UE according to these contexts.

Fifth Aspect: Trigger for UE to Reestablish a Connection

After a connection failure occurs at the relay node, the UE accessing the relay node may need to reestablish the connection. However, the reason for the UE to trigger a connection reestablishment is that the UE has a radio link failure, or a handover has failed, or a reconfiguration has failed. These reasons are all behaviors on the UE side, that is, the reestablishment process will be triggered only if the UE has found the above failure. However, in a multi-hop network, if the reestablishment is initiated until the UE accessing the relay node found the above failure, it will increase the latency of the reestablishment. In order to solve this problem, the present disclosure may propose that the UE can be triggered by the network side to start the reestablishment process.

Hereinafter, a method performed at a fifth node for reestablishing a connection according to an exemplary embodiment of the present disclosure will be described in detail with reference to FIG. 27. Here, the fifth node may include at least one of: a relay node, a DU of the relay node, an anchor node, and a CU of the anchor node.

Figure 27:
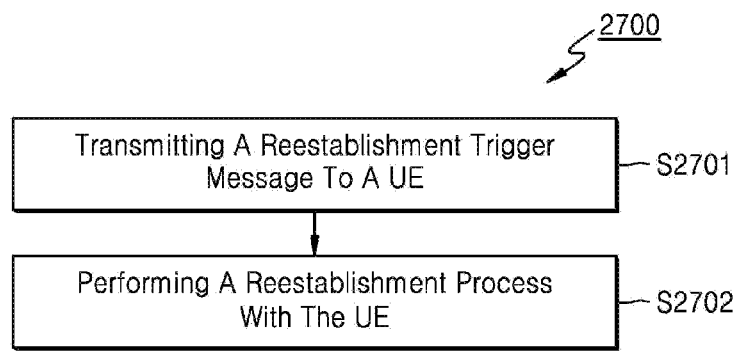
FIG. 27 schematically illustrates a flowchart of a method performed at a fifth node for reestablishing a connection according to an exemplary embodiment of the present disclosure.

FIG. 27 schematically illustrates a flowchart of a method 2700 performed at a fifth node for reestablishing a connection according to an exemplary embodiment of the present disclosure.

As shown in FIG. 27, the method 2700 may include steps S2701 to S2702.

In step S2701, the fifth node may transmit a reestablishment trigger message to the UE.

The reestablishment trigger message may include at least one of indication information for indicating that a connection failure occurs at a relay node connected to the UE, indication information for indicating the UE to initiate the reestablishment process, identification information of the cell the UE is accessing when performing the reestablishment, or information related to random access resources used by the UE when performing the reestablishment.

The above reestablishment trigger message may be an RRC message or a system message, or a MAC/RLC layer message, or a physical layer message.

In step S2702, the fifth node may perform a reestablishment process with the UE.

In another embodiment, in step S2702, the UE may also perform a reestablishment process with other nodes.

Figure 28:
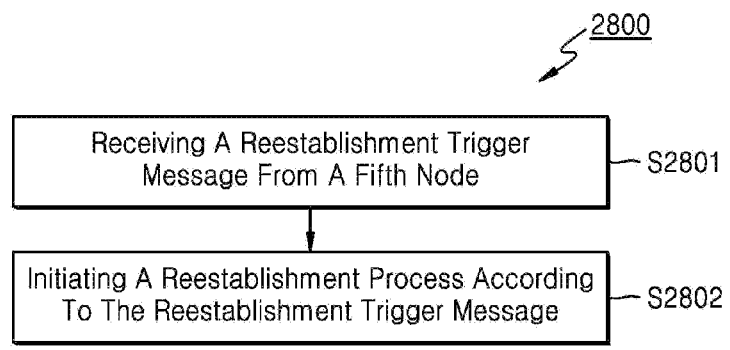
FIG. 28 schematically illustrates a flowchart of a method performed at a UE for reestablishing a connection according to an exemplary embodiment of the present disclosure.

Accordingly, FIG. 28 schematically illustrates a flowchart of a method 2800 performed at a UE for reestablishing a connection according to an exemplary embodiment of the present disclosure.

As shown in FIG. 28, the method 2800 may include steps S2801 to S2802.

In step S2801, the UE may receive the above-mentioned reestablishment trigger message from the fifth node.

In step S2802, the UE may initiate a reestablishment process according to the reestablishment trigger message.

A signaling flow for reestablishing a connection according to an exemplary embodiment of the present disclosure may be described below with reference to FIG. 29, in which a relay node or anchor node is used as an example of the fifth node, and the relay node or anchor node may perform the method 2700 described with reference to FIG. 27, see the foregoing description for FIG. 27 for details.

Figure 29:
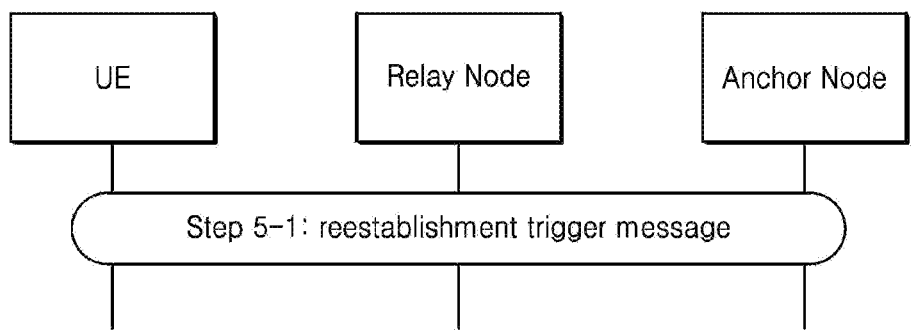
FIG. 29 schematically illustrates a signaling flowchart for reestablishing a connection according to an exemplary embodiment of the present disclosure.

As shown in FIG. 29, the signaling flow may include the following steps:

Step 5-1: the relay node or anchor node may transmit a reestablishment trigger message to the UE, and the message may include at least one of indication information for triggering the reestablishment, which instructs the UE to initiate the reestablishment process, indication information for indicating that a connection failure occurs at a relay node connected to the UE, identification information of a cell the UE is accessing when performing the reestablishment, such as PCI, NR CGI, and the like, or information related to random access resources used by the UE when performing the reestablishment.

Further, the message may refer to the Handover Command message.

Further, the fifth node may also transmit user access related information to the user, and the information may include one of information:
1. information indicating that the cell is barred
2. indication information for indicating that new user access is prohibited;
3. time information for indicating that new user access is prohibited, wherein the time information may indicate that new user access is not allowed during the time indicated by the information;
4. time information for indicating the amount of time the user needs to wait before accessing the network, wherein the time information may indicate the amount of time the user needs to wait before accessing the network.

The information related to user access may be transmitted through system information, or may be transmitted through a RRC message, or a MAC/RLC layer message, or a physical layer message.

According to the above-mentioned exemplary embodiment of the present disclosure for the fifth aspect, after the UE receives a reestablishment trigger, the UE may initiate a reestablishment process without waiting for a radio link failure, a handover failure, or a reconfiguration failure.

In combination with the above five aspects, the process of reestablishing after a connection failure occurs at the relay node may have the following possible exemplary implementations, as shown in FIGS. 30 to 33.

Figure 30:
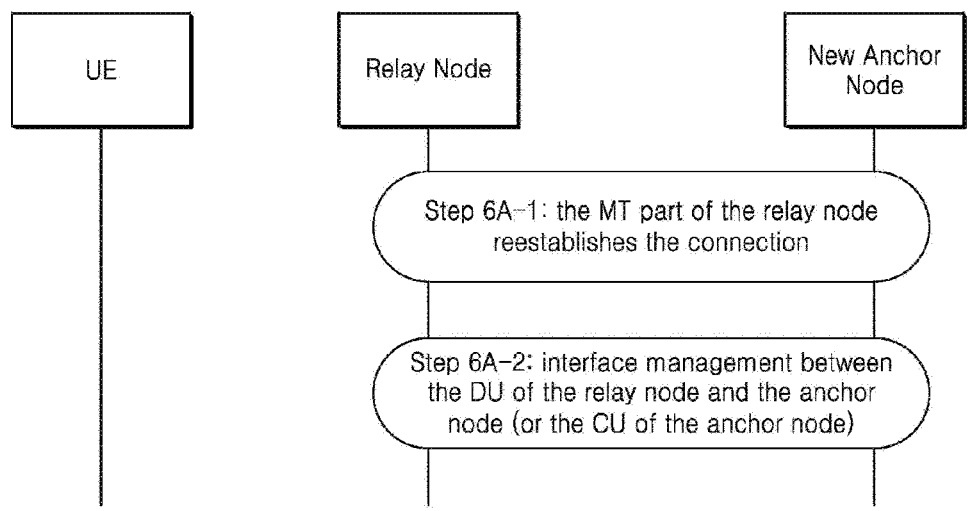
FIG. 30 schematically illustrates a signaling flowchart for reestablishing a connection according to a first implementation of the present disclosure.

FIG. 30 schematically illustrates a signaling flowchart for reestablishing a connection according to a first implementation of the present disclosure.

This exemplary implementation may be applied to a case where the new anchor node accessed by the relay node for reestablishing a connection (the new anchor node may be the old anchor node connected when a connection failure occurs at the relay node, or it may be another anchor node) has the context of the relay node.

As shown in FIG. 30, the signaling flow may include the following steps:

Step 6A-1: the MT part of the relay node may reestablish the connection, see the foregoing description of the first aspect of the present disclosure;

Step 6A-2: interface management between the distributed unit of the relay node and the anchor node (the CU of the anchor node), see the foregoing description of the third aspect of the present disclosure.

In this exemplary implementation, since the accessed anchor node has the context of the relay node, there may be no need to perform additional operations on the UE side (for example, the UE does not need to perform the reestablishment).

Figure 31:
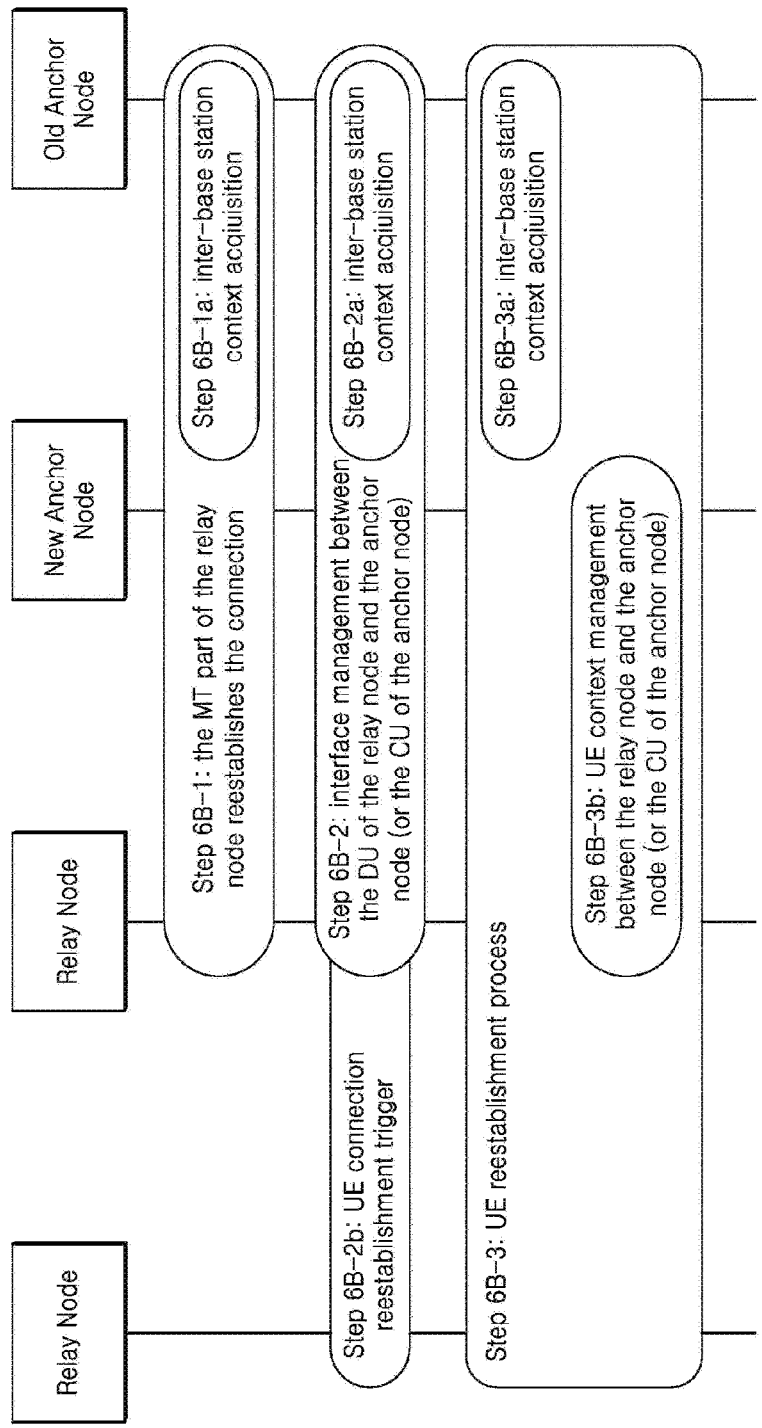
FIG. 31 schematically illustrates a signaling flowchart for reestablishing a connection according to a second implementation of the present disclosure.

FIG. 31 schematically illustrates a signaling flowchart for reestablishing a connection according to a second implementation of the present disclosure.

This exemplary implementation may be applied to the case where the new anchor node accessed by the relay node for reestablishing a connection has no context of the relay node, but the context of the relay node may be acquired from the old anchor node. As shown in FIG. 31, the signaling flow may include the following steps:

Step 6B-1: the MT part of the relay node may reestablish the connection, see the first aspect of the present disclosure. In this process, optionally, the signaling flow may include step 6B-1a, that is, inter-base station context acquisition, see the foregoing description of the second aspect of the present disclosure. There is no restriction on the order of sub-steps in the above two steps.

Step 6B-2: interface management between the distributed unit (DU) of the relay node and the anchor node (or the CU of the anchor node), see the foregoing description of the third aspect of the present disclosure. In this process, optionally, the signaling flow may further include step 6B-2a, that is, inter-base station context acquisition, see the foregoing description of the second aspect of the present disclosure, and/or step 6B-2b, that is, UE connection reestablishment trigger, see the foregoing description of the fifth aspect of the present disclosure. There is no restriction on the order of sub-steps in the above three steps.

Step 6B-3: UE reestablishment process, see the UE reestablishment process in the prior art. This process, however, may optionally include step 6B-3a, that is, the inter-base station context acquisition, see the foregoing description of the second aspect of the present disclosure, and/or step 6B-3b, that is, the UE context management between the relay node and the anchor node (or the CU of the anchor node), see the foregoing description of the fourth aspect of the present disclosure. There is no restriction on the order of sub-steps in the above three steps.

The above process can be applied to a case where the UE reestablishment needs to be triggered. For example, after the relay node reestablishes a connection with a new anchor node, the identification information of the serving cell of the relay node will change because the new anchor node belongs to a different base station, so that the UE connected to the relay node cannot find the cell served by the relay node before the connection failure, so the UE will initiate the reestablishment process.

Figure 32:
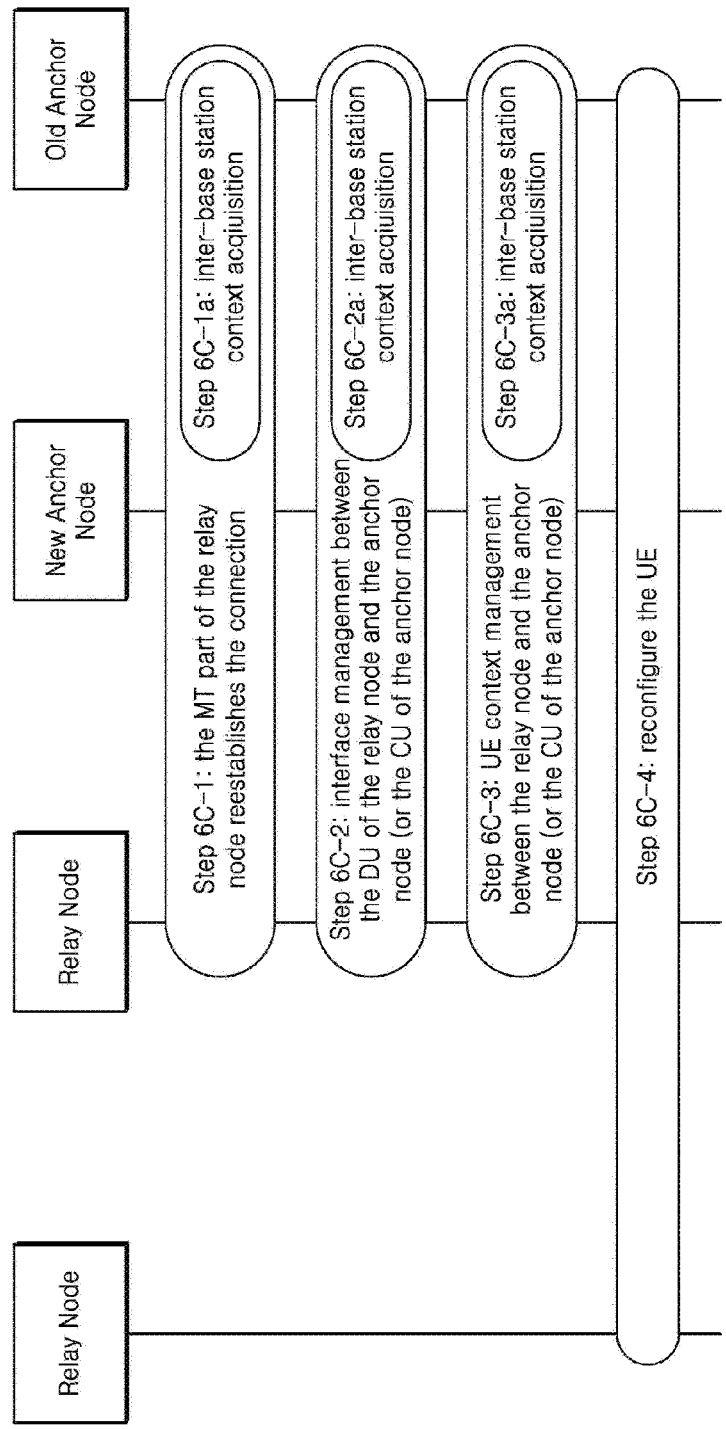
FIG. 32 schematically illustrates a signaling flowchart for reestablishing a connection according to a third implementation of the present disclosure.

FIG. 32 schematically illustrates a signaling flowchart for reestablishing a connection according to a third implementation of the present disclosure.

This exemplary implementation may be applied to the case where the new anchor node accessed by the relay node for reestablishing a connection has no context of the relay node, but the context of the relay node may be acquired from the old anchor node. As shown in FIG. 32, the signaling flow may include the following steps:

Step 6C-1: the MT part of the relay node may reestablish the connection, see the foregoing description of the first aspect of the present disclosure. In this process, optionally, the signaling flow may include step 6C-1a, that is, inter-base station context acquisition, see the foregoing description of the second aspect of the present disclosure. There is no restriction on the order of sub-steps in the above two steps.

Step 6C-2: interface management between the distributed unit of the relay node and the anchor node (or the CU of the anchor node), see the foregoing description of the third aspect of the present disclosure. In this process, optionally, the signaling flow may further include step 6C-2a, that is, inter-base station context acquisition, see the foregoing description of the second aspect of the present disclosure. There is no restriction on the order of sub-steps in the above two steps.

Step 6C-3: UE context management between the relay node and the anchor node (or the CU of the anchor node), see the foregoing description of the fourth aspect of the present disclosure, which optionally includes step 6C-3a, that is, inter-base station context acquisition, see the foregoing description of the second aspect of the present disclosure. There is no restriction on the order of sub-steps in the above two steps.

Optionally, step 6C-4: the anchor node and/or the relay node may reconfigure the UE. In an embodiment, an RRCReconfiguration message may be transmitted to the UE.

The above process can be applied to a case where the UE reestablishment needs not to be triggered. For example, after the relay node reestablishes a connection with a new anchor node, although the new anchor node is used, the configuration (such as NR CGI) of the cell served by the relay node may remain unchanged, so the UE can still maintain the connection to a cell. Optionally, the context of the UE will be updated between the relay node and the anchor node to reconfigure the UE.

Figure 33:
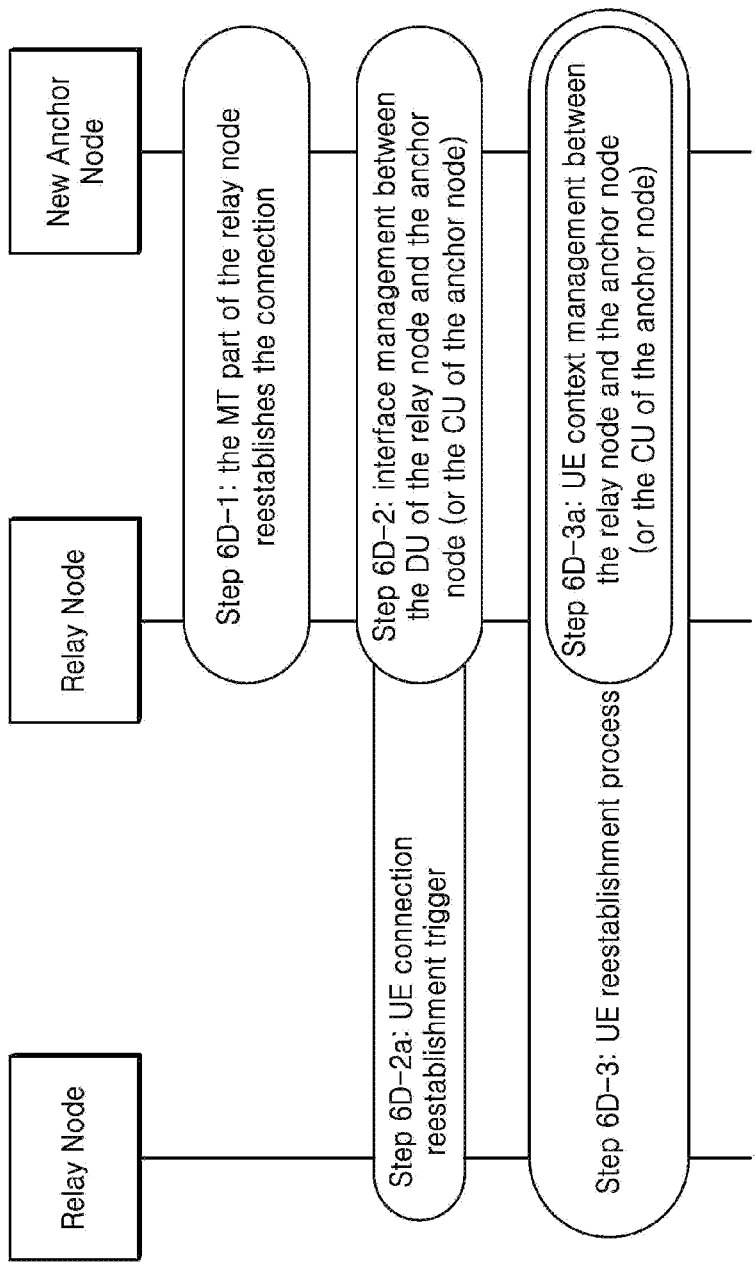
FIG. 33 schematically illustrates a signaling flowchart for reestablishing a connection according to a fourth implementation of the present disclosure.

FIG. 33 schematically illustrates a signaling flowchart for reestablishing a connection according to a third implementation of the present disclosure.

This exemplary implementation may be applied to the case where the new anchor node accessed by the relay node for reestablishing a connection has no context of the relay node, but the context of the relay node may be acquired from the old anchor node. As shown in FIG. 33, the signaling flow may include the following steps:

Step 6D-1: the MT part of the relay node may reestablish the connection, see the foregoing description of the first aspect of the present disclosure.

Step 6D-2: interface management between the distributed unit of the relay node and the anchor node (or the CU of the anchor node), see the third aspect of the present disclosure. In this process, optionally, the signaling flow may further include step 6D-2a, that is, UE connection reestablishment trigger, see the foregoing description of the fifth aspect of the present disclosure. There is no restriction on the order of sub-steps in the above two steps.

Step 6D-3: UE reestablishment process, see the UE reestablishment process. This process, however, may optionally include step 6D-3a, that is, the UE context management between the relay node and the anchor node (or the CU of the anchor node), see the foregoing description of the fourth aspect of the present disclosure. There is no restriction on the order of sub-steps in the above two steps.

The above process can be applied to a case where the new anchor node cannot acquire the context of the UE and thus needs to trigger the UE reestablishment. For example, after the relay node reestablishes a connection with a new anchor node, the UE will initiate a reestablishment process. The relay node may contain the context of the UE. Through step 6D-3a, the new anchor node may acquire contexts of some UEs from the relay node, which can help the new anchor node to configure the UE.

Through the information exchange between the anchor nodes, the information exchange between the anchor node and the relay node, and the information exchange between the anchor node/relay node and the UE, the relay node can complete the reestablishment process, and the UE accessing the relay node can also complete the reestablishment process.

Figure 34:
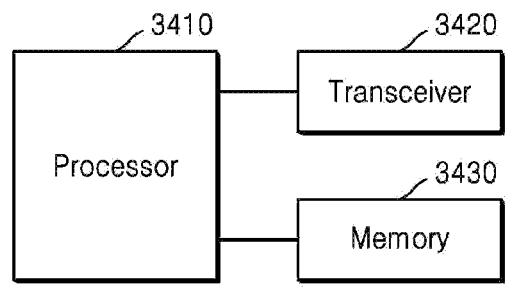
FIG. 34 schematically illustrates a structural block diagram of a first node according to an exemplary embodiment of the present disclosure.

The structure of the first node according to an exemplary embodiment of the present disclosure will be described below with reference to FIG. 34. FIG. 34 schematically illustrates a structural block diagram of a first node according to an exemplary embodiment of the present disclosure. The first node may be used to perform the foregoing method 200 described with reference to FIG. 2, method 1200 described with reference to FIG. 12, method 1800 described with reference to FIG. 18, method 2100 described with reference to FIG. 21, and method 2400 described with reference to FIG. 24.

As shown in FIG. 34, the first node may include a processing unit or a processor 3410, wherein the processor 3410 may be a single unit or a combination of multiple units for performing different steps of the method; a transceiver 3420 including a RF transmitter for up-converting and amplifying a transmitted signal, and a RF receiver for down-converting a frequency of a received signal; and a memory 3430 for storing computer executable instructions, which when executed by the processor 3410, cause the first node 3400 to execute the method 200, 1200, 1800, 2100, or 2400. For brevity, only the schematic structure of the first node according to the exemplary embodiment of the present disclosure is described herein, and details that have been detailed in the method 200 described with reference to FIG. 2, the method 1200 described with reference to FIG. 12, and the method 1800 described with reference to FIG. 18, the method 2100 described with reference to FIG. 21, and the method 2400 described with reference to FIG. 24 are omitted. The processor 3410 may include one or more processors or other processing devices that control the proposed function, process, and/or method. Operation of the first node 3400 may be implemented by the processor 3410. However, all of the illustrated components are not essential. The first node 3400 may be implemented by more or less components than those illustrated in FIG. 34. In addition, the processor 3410 and the transceiver 3420 and the memory 3430 may be implemented as a single chip according to another embodiment.

As mentioned above, the first node 3400 may be a relay node or a distributed unit, DU, of the relay node.

Figure 35:
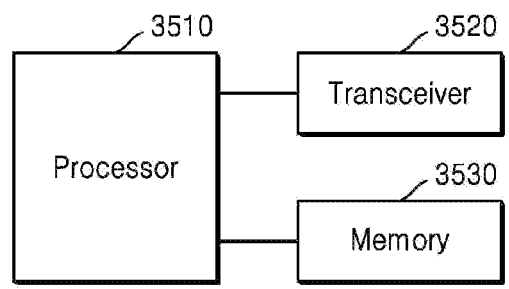
FIG. 35 schematically illustrates a structural block diagram of a second node according to an exemplary embodiment of the present disclosure.

The structure of the second node according to an exemplary embodiment of the present disclosure will be described below with reference to FIG. 35. FIG. 35 schematically illustrates a structural block diagram of a second node according to an exemplary embodiment of the present disclosure. The second node may be used to perform the foregoing method 300 described with reference to FIG. 3, method 1300 described with reference to FIG. 13, method 1900 described with reference to FIG. 19, method 2200 described with reference to FIG. 22, and method 2500 described with reference to FIG. 25.

As shown in FIG. 35, the second node may include a processing unit or a processor 3510, wherein the processor 3510 may be a single unit or a combination of multiple units for performing different steps of the method; a transceiver 3520 including a RF transmitter for up-converting and amplifying a transmitted signal, and a RF receiver for down-converting a frequency of a received signal; and a memory 3530 for storing computer executable instructions, which when executed by the processor 3510, cause the second node 3500 to execute the method 300, 1300, 1900, 2200, or 2500. For brevity, only the schematic structure of the second node according to the exemplary embodiment of the present disclosure is described herein, and details that have been detailed in the method 300 described with reference to FIG. 3, the method 1300 described with reference to FIG. 13, and the method 1900 described with reference to FIG. 19, the method 2200 described with reference to FIG. 22, and the method 2500 described with reference to FIG. 25 are omitted. The processor 3510 may include one or more processors or other processing devices that control the proposed function, process, and/or method. Operation of the second node 3500 may be implemented by the processor 3510. However, all of the illustrated components are not essential. The second node 3500 may be implemented by more or less components than those illustrated in FIG. 35. In addition, the processor 3510 and the transceiver 3520 and the memory 3530 may be implemented as a single chip according to another embodiment.

As mentioned above, the second node 3500 may be an anchor node or a CU of the anchor node.

Figure 36:
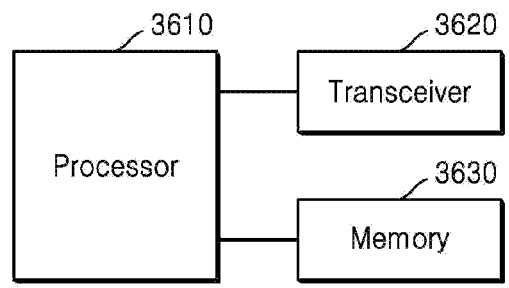
FIG. 36 schematically illustrates a structural block diagram of a third node according to an exemplary embodiment of the present disclosure.

The structure of the third node according to an exemplary embodiment of the present disclosure will be described below with reference to FIG. 36. FIG. 36 schematically illustrates a structural block diagram of a third node according to an exemplary embodiment of the present disclosure. The third node may be used to perform the method 500 described above with reference to FIG. 5.

As shown in FIG. 36, the third node may include a processing unit or a processor 3610, wherein the processor 3610 may be a single unit or a combination of multiple units for performing different steps of the method; a transceiver 3620 including a RF transmitter for up-converting and amplifying a transmitted signal, and a RF receiver for down-converting a frequency of a received signal; and a memory 3630 for storing computer executable instructions, which when executed by the processor 3610, cause the third node 3600 to execute the method 500. For brevity, only the schematic structure of the third node according to the exemplary embodiment of the present disclosure is described herein, and details that have been detailed in the method 500 described with reference to FIG. 5 are omitted. The processor 3610 may include one or more processors or other processing devices that control the proposed function, process, and/or method. Operation of the third node 3600 may be implemented by the processor 3510. However, all of the illustrated components are not essential. The third node 3600 may be implemented by more or less components than those illustrated in FIG. 36. In addition, the processor 3610 and the transceiver 3620 and the memory 3630 may be implemented as a single chip according to another embodiment.

As mentioned above, the third node 3600 may be an anchor node connected to a relay node when the connection is being reestablished, or a CU of the anchor node.

Figure 37:
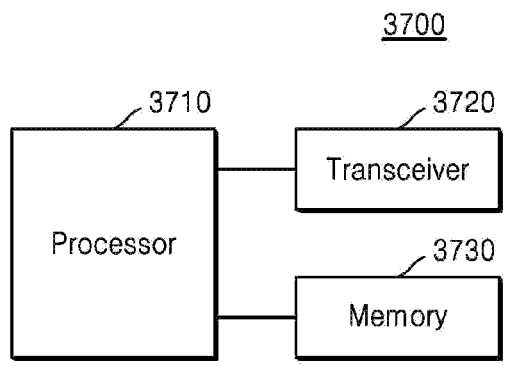
FIG. 37 schematically illustrates a structural block diagram of a fourth node according to an exemplary embodiment of the present disclosure.

The structure of the fourth node according to an exemplary embodiment of the present disclosure will be described below with reference to FIG. 37. FIG. 37 schematically illustrates a structural block diagram of a fourth node according to an exemplary embodiment of the present disclosure. The fourth node may be used to perform the method 600 described above with reference to FIG. 6.

As shown in FIG. 37, the fourth node may include a processing unit or a processor 3710, wherein the processor 3710 may be a single unit or a combination of multiple units for performing different steps of the method; a transceiver 3720 including a RF transmitter for up-converting and amplifying a transmitted signal, and a RF receiver for down-converting a frequency of a received signal; and a memory 3730 for storing computer executable instructions, which when executed by the processor 3710, cause the fourth node 3700 to execute the method 600. For brevity, only the schematic structure of the fourth node according to the exemplary embodiment of the present disclosure is described herein, and details that have been detailed in the method 600 described with reference to FIG. 6 are omitted. The processor 3710 may include one or more processors or other processing devices that control the proposed function, process, and/or method. Operation of the fourth node 3700 may be implemented by the processor 3710. However, all of the illustrated components are not essential. The fourth node 3700 may be implemented by more or less components than those illustrated in FIG. 37. In addition, the processor 3710 and the transceiver 3720 and the memory 3730 may be implemented as a single chip according to another embodiment.

As mentioned above, the fourth node may be an anchor node connected to the relay node before the connection is reestablished or when a connection failure occurs, or a CU of the anchor node.

Figure 38:
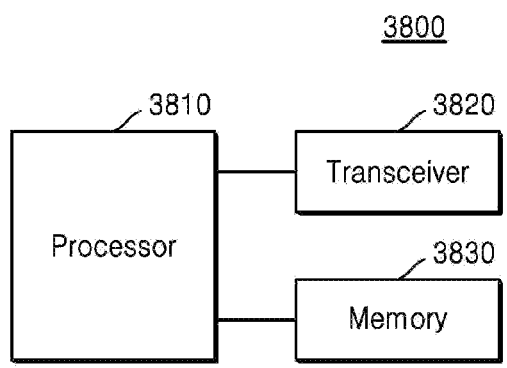
FIG. 38 schematically illustrates a structural block diagram of a fifth node according to an exemplary embodiment of the present disclosure.

The structure of the fifth node according to an exemplary embodiment of the present disclosure will be described below with reference to FIG. 38. FIG. 38 schematically illustrates a structural block diagram of a fifth node according to an exemplary embodiment of the present disclosure. The fifth node may be used to perform the method 2700 described above with reference to FIG. 27.

As shown in FIG. 38, the fifth node may include a processing unit or a processor 3800, wherein the processor 3810 may be a single unit or a combination of multiple units for performing different steps of the method; a transceiver 3820 including a RF transmitter for up-converting and amplifying a transmitted signal, and a RF receiver for down-converting a frequency of a received signal; and a memory 3830 for storing computer executable instructions, which when executed by the processor 3810, cause the fifth node 3800 to execute the method 2700. For brevity, only the schematic structure of the fifth node according to the exemplary embodiment of the present disclosure is described herein, and details that have been detailed in the method 2700 described with reference to FIG. 27 are omitted. The processor 3810 may include one or more processors or other processing devices that control the proposed function, process, and/or method. Operation of the fifth node 3800 may be implemented by the processor 3810. However, all of the illustrated components are not essential. The fifth node 3800 may be implemented by more or less components than those illustrated in FIG. 38. In addition, the processor 3810 and the transceiver 3820 and the memory 3830 may be implemented as a single chip according to another embodiment.

As mentioned above, the fifth node 3800 may include at least one of: a relay node, a DU of the relay node, an anchor node, and/or a CU of the anchor node.

Figure 39:
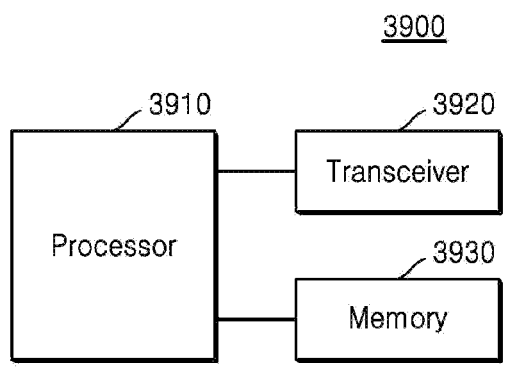
FIG. 39 schematically illustrates a structural block diagram of a UE according to an exemplary embodiment of the present disclosure.

The structure of the UE (User equipment) according to an exemplary embodiment of the present disclosure will be described below with reference to FIG. 39. FIG. 39 schematically illustrates a structural block diagram of a UE according to an exemplary embodiment of the present disclosure. The UE may be used to perform the method 2800 described above with reference to FIG. 28.

Referring to the FIG. 39, the UE 3900 may include a processor 3910, a transceiver 3920 and a memory 3930. However, all of the illustrated components are not essential. The UE 3900 may be implemented by more or less components than those illustrated in FIG. 39. In addition, the processor 3910 and the transceiver 3920 and the memory 3930 may be implemented as a single chip according to another embodiment.

The processor 3910 may include one or more processors or other processing devices that control the proposed function, process, and/or method. Operation of the UE 3900 may be implemented by the processor 3910. The transceiver 3920 may include a RF transmitter for up-converting and amplifying a transmitted signal, and a RF receiver for down-converting a frequency of a received signal. However, according to another embodiment, the transceiver 3920 may be implemented by more or less components than those illustrated in components. The transceiver 3920 may be connected to the processor 3910 and transmit and/or receive a signal. The signal may include control information and data. In addition, the transceiver 3920 may receive the signal through a wireless channel and output the signal to the processor 3910. The transceiver 3920 may transmit a signal output from the processor 3910 through the wireless channel. The memory 3930 may store the control information or the data included in a signal obtained by the UE 3900. The memory 3930 may be connected to the processor 3910 and store at least one instruction or a protocol or a parameter for the proposed function, process, and/or method. The memory 3930 may include read-only memory (ROM) and/or random access memory (RAM) and/or hard disk and/or CD-ROM and/or DVD and/or other storage devices.

The processor 3910 may cause the UE 3900 to execute the method 2800. For brevity, only the schematic structure of the UE according to the exemplary embodiment of the present disclosure is described herein, and details that have been detailed in the method 2800 described with reference to FIG. 28 are omitted.

The program running on the device according to the present disclosure may be a program that causes a computer to implement functions of the embodiments of the present disclosure by controlling a central processing unit (CPU). The program or information processed by the program may be temporarily stored in a volatile memory (such as Random Access Memory, RAM), Hard Disk Drive (HDD), non-volatile memory (such as Flash memory), or other memory systems.

The program for implementing functions of the embodiments of the present disclosure may be recorded on a computer-readable recording medium. Corresponding functions can be realized by causing a computer system to read programs recorded on the recording medium and execute the programs. The so-called "computer system" herein may be a computer system embedded in the device, and may include an operating system or hardware (such as a peripheral device). The "computer-readable recording medium" may be a semiconductor recording medium, an optical recording medium, a magnetic recording medium, a recording medium for a transient and dynamic program storage, or any other recording medium readable by a computer.

Various features or functional modules of the device used in the above embodiments may be implemented or executed by a circuit (for example, a single-chip or multiple-chip integrated circuits). Circuits designed to perform functions described in this specification may include general purpose processors, Digital Signal Processors (DSPs), Application Specific Integrated Circuits (ASICs), Field Programmable Gate Arrays (FPGAs), or other programmable logic devices, discrete gates or transistor logics, discrete hardware components, or any combination of the above. The general-purpose processor may be a microprocessor, or any existing processor, controller, microcontroller, or state machine. The above circuit may be a digital circuit or an analog circuit. When new integrated circuit technologies that replace existing integrated circuits appear due to advances in semiconductor technology, one or more embodiments of the present disclosure may also be implemented using these new integrated circuit technologies.

As above, the embodiments of the present disclosure have been described in detail with reference to the drawings. However, the specific structure is not limited to the above-mentioned embodiments, and the present disclosure may also include any design changes without departing from the gist of the present disclosure. In addition, various modifications can be made to the present disclosure within the scope of the claims, and the embodiments obtained by appropriately combining the technical means disclosed in different embodiments are also included in the technical scope of the present disclosure. In addition, components having the same effects as described in the above embodiments may be replaced with each other.

The above description is only a preferred embodiment of the present disclosure and an explanation of the applied technical principles. Those skilled in the art should understand that the scope of the invention involved in this application is not limited to the technical solution of the specific combination of the above technical features, but also covers any other solutions formed by any combination of the above technical features or equivalents thereof without departing from the inventive concept, such as a technical solution formed by replacing the above features with technical features disclosed (but not limited to) in this application having similar functions.

The invention claimed is:

1. A method performed by a new Integrated Access and Backhaul (IAB) donor node in a wireless communication system, the method comprising:
   receiving, from a first IAB node, a radio resource control (RRC) message based on an RRC reestablishment message transmitted from a second IAB node to the first IAB node;
   transmitting a user equipment (UE) context request message to old IAB donor node;
   receiving, from the old IAB donor node, a UE context response message including transport network layer (TNL) address information of the second IAB node; and
   transmitting a message including information related to configuration of the new IAB donor node towards the second IAB node.

2. The method of claim 1,
   wherein the old IAB donor node is connected to the second IAB node before a connection failure occurs, and the new IAB donor node is connected to the second IAB node after a connection is re-established, and the second IAB node performs reestablishment after the connection failure occurs.

3. The method of claim 1,
   wherein the TNL address information of the second IAB node is an IP address.

4. The method of claim 1,
   wherein the information related to configuration of the new IAB donor node includes an IP address.

5. A new Integrated Access and Backhaul (IAB) donor node in a wireless communication system, the new IAB donor node comprising:
   a transceiver; and
   at least one processor coupled with the transceiver and configured to:
      receive, from a first IAB node, a radio resource control (RRC) message based on an RRC reestablishment message transmitted from a second IAB node to the first IAB node,
      transmit a user equipment (UE) context request message to old IAB donor node,
      receive, from the old IAB donor node, a UE context response message including transport network layer (TNL) address information of the second IAB node, and
      transmit a message including information related to configuration of the new IAB donor node towards the second IAB node.

6. The new IAB donor node of claim 5,
   wherein the old IAB donor node is connected to the second IAB node before a connection failure occurs, and the new IAB donor node is connected to the second IAB node after a connection is re-established, and the second IAB node performs reestablishment after the connection failure occurs.

7. The new IAB donor node of claim 5,
   wherein the TNL address information of the second IAB node is an IP address.

8. The new IAB donor node of claim 5,
   wherein the information related to configuration of the new IAB donor node includes an IP address.

9. A method performed by a second Integrated Access and Backhaul (IAB) node in a wireless communication system, the method comprising:
   transmitting, to a first IAB node, a radio resource control (RRC) reestablishment message; and
   receiving a message including information related to configuration of a new IAB donor node,
   wherein an RRC message is transmitted based on the RRC reestablishment message, from the first IAB node to the new IAB donor node,
   wherein a user equipment (UE) context request message is transmitted form the new IAB donor node to old IAB donor node,
   wherein a UE context response message including transport network layer (TNL) address information of the second IAB node is received, from the old IAB donor node.

10. The method of claim 9,
   wherein the old IAB donor node is connected to the second IAB node before a connection failure occurs, and the new IAB donor node is connected to the second IAB node after a connection is re-established, and the second IAB node performs reestablishment after the connection failure occurs.

11. The method of claim 9,
wherein the TNL address information of the second IAB node is an IP address.

12. The method of claim 9,
wherein the information related to configuration of the new IAB donor node includes an IP address.

13. A second Integrated Access and Backhaul (IAB) node in a wireless communication system, the second IAB node comprising:
a transceiver; and
at least one processor coupled with the transceiver and configured to:
transmit, to a first IAB node, a radio resource control (RRC) reestablishment message, and
receive a message including information related to configuration of a new IAB donor node,
wherein an RRC message is transmitted based on the RRC reestablishment message, from the first IAB node to the new IAB donor node,
wherein a user equipment (UE) context request message is transmitted form the new IAB donor node to old IAB donor node,
wherein a UE context response message including transport network layer (TNL) address information of the second IAB node is received, from the old IAB donor node.

14. The second IAB node of claim 13,
wherein the old IAB donor node is connected to the second IAB node before a connection failure occurs, and the new IAB donor node is connected to the second IAB node after a connection is re-established, and the second IAB node performs reestablishment after the connection failure occurs.

15. The second IAB node of claim 13,
wherein the TNL address information of the second IAB node is an IP address.

16. The second IAB node of claim 13,
wherein the information related to configuration of the new IAB donor node includes an IP address.

* * * * *